United States Patent [19]

Kim et al.

[11] 4,116,551
[45] Sep. 26, 1978

[54] PROJECTOR AUTO REWIND MECHANISM

[75] Inventors: Raymond W. H. Kim, Skokie; Arthur L. Lueders, Mundelein; Edward R. Prelletz; Gerald D. Warden, both of Chicago, all of Ill.

[73] Assignee: Bell & Howell Company, Chicago, Ill.

[21] Appl. No.: 770,257

[22] Filed: Feb. 18, 1977

[51] Int. Cl.² .............................................. G03B 23/00
[52] U.S. Cl. ...................... 352/124; 226/49; 242/189; 242/190; 242/205; 352/173
[58] Field of Search ............... 352/124, 173; 242/189, 242/190, 205; 226/49

[56] References Cited

U.S. PATENT DOCUMENTS 2,009,442   7/1935   Foster et al. ........................ 352/124

*Primary Examiner*—Monroe H. Hayes
*Attorney, Agent, or Firm*—James V. Lapacek; Aaron Passman; Roger M. Fitz-Gerald

[57] ABSTRACT

A motion picture projector having a forward and reverse film transporting drive, an assembly for sensing a predetermined film tension condition and a mode controller for selecting various operational modes is provided with a control for selectively actuating a rewind mode of operation at a predetermined film tension condition.

The selectively actuated rewind control arrangement includes a controller conditioner mechanism that is responsive to film tension and effective to position the controller from a predetermined projector operating mode such as a normal forward mode to a predetermined operating mode such as still when the predetermined film tension condition is sensed. A rewind mode actuator mechanism responsive to the controller conditioner mechanism is provided to control the film transporting drive in the rewind mode upon the operation of the controller conditioner mechanism.

The rewind mode actuator mechanism in one arrangement includes a translating member for converting a linear displacement of the controller conditioning mechanism to a rotational movement which is connected to rotate a coupling rod carrying a displacing actuator. The displacing actuator displaces a reverse drive actuator in the film transporting assembly to condition it in a rewind mode.

14 Claims, 29 Drawing Figures

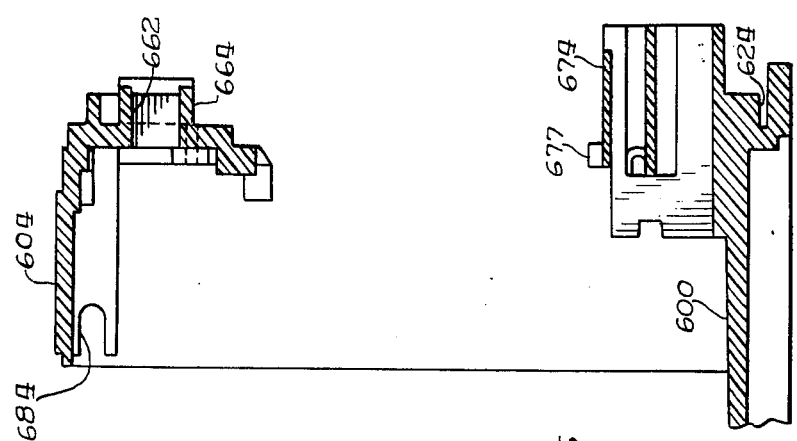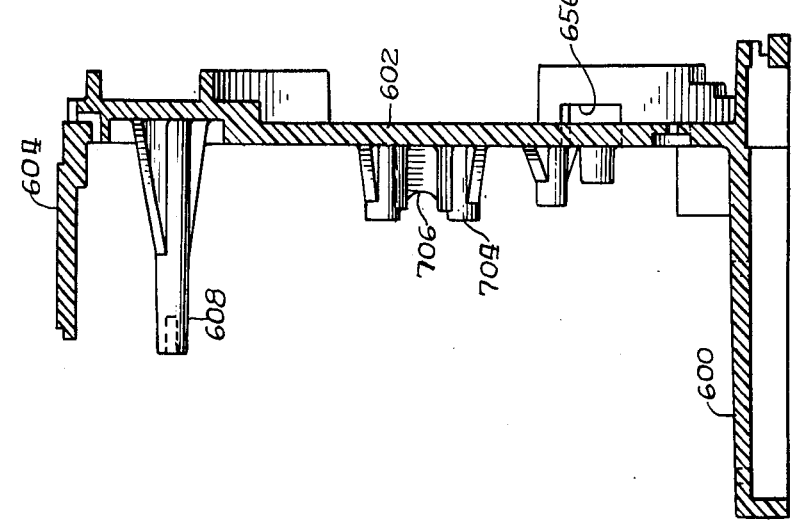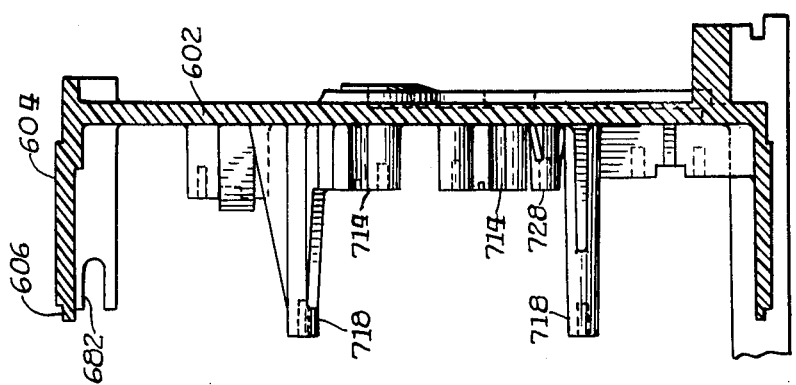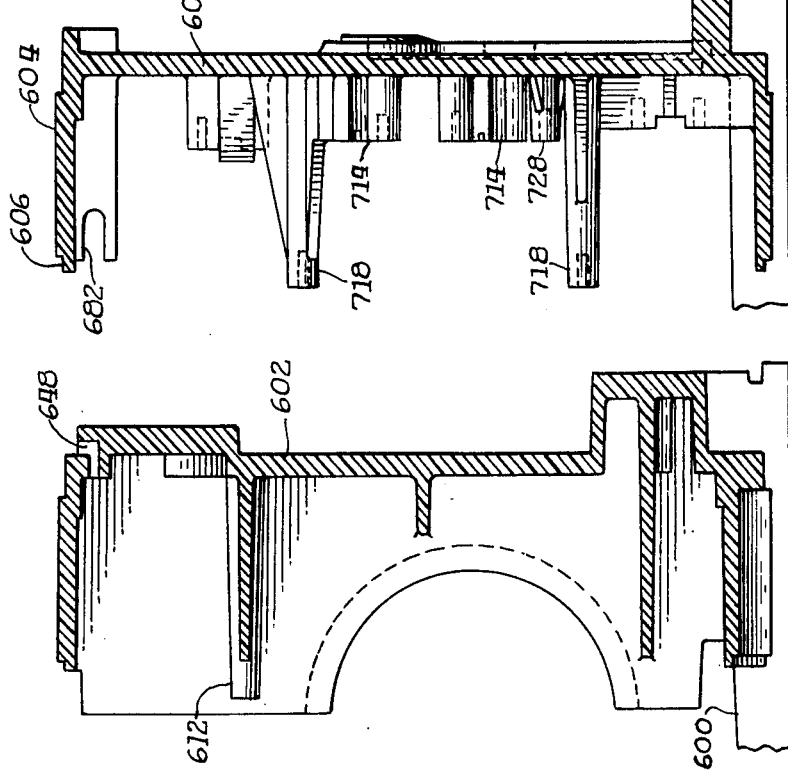

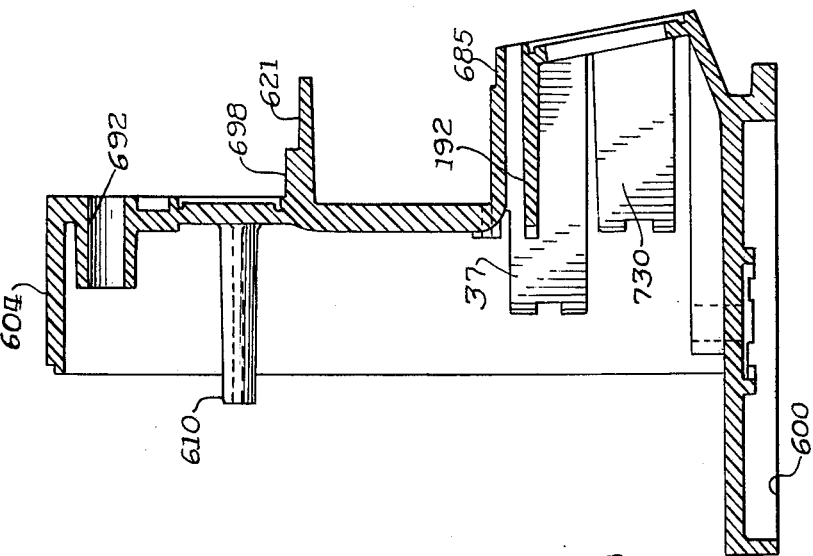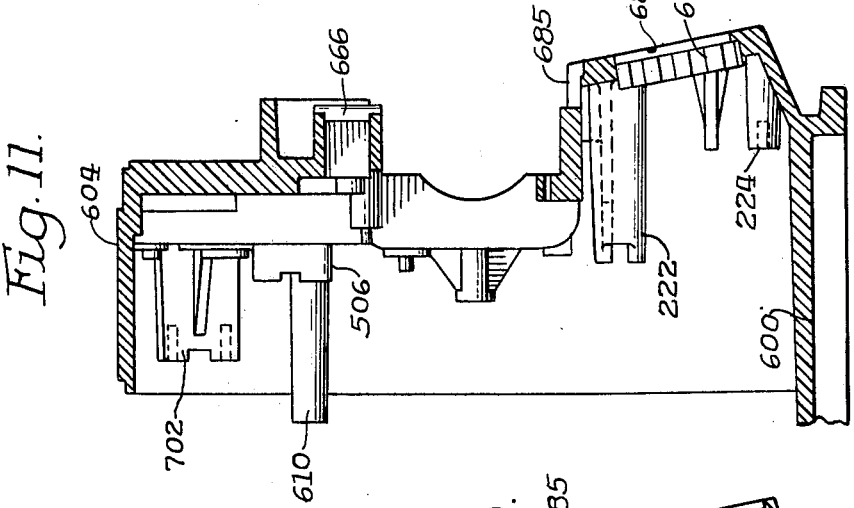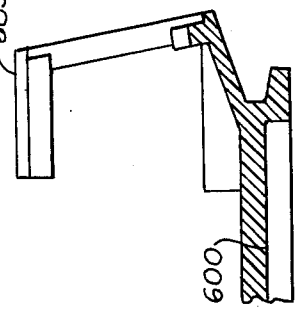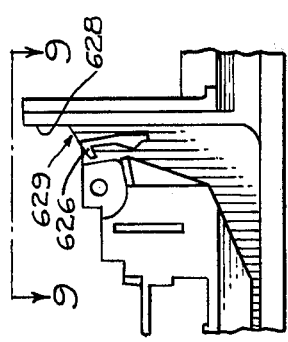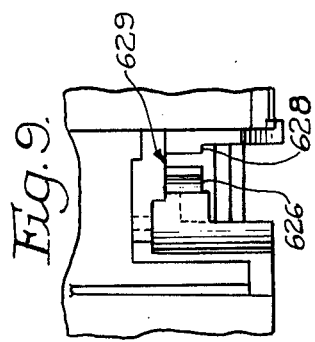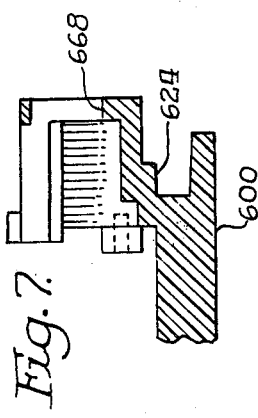

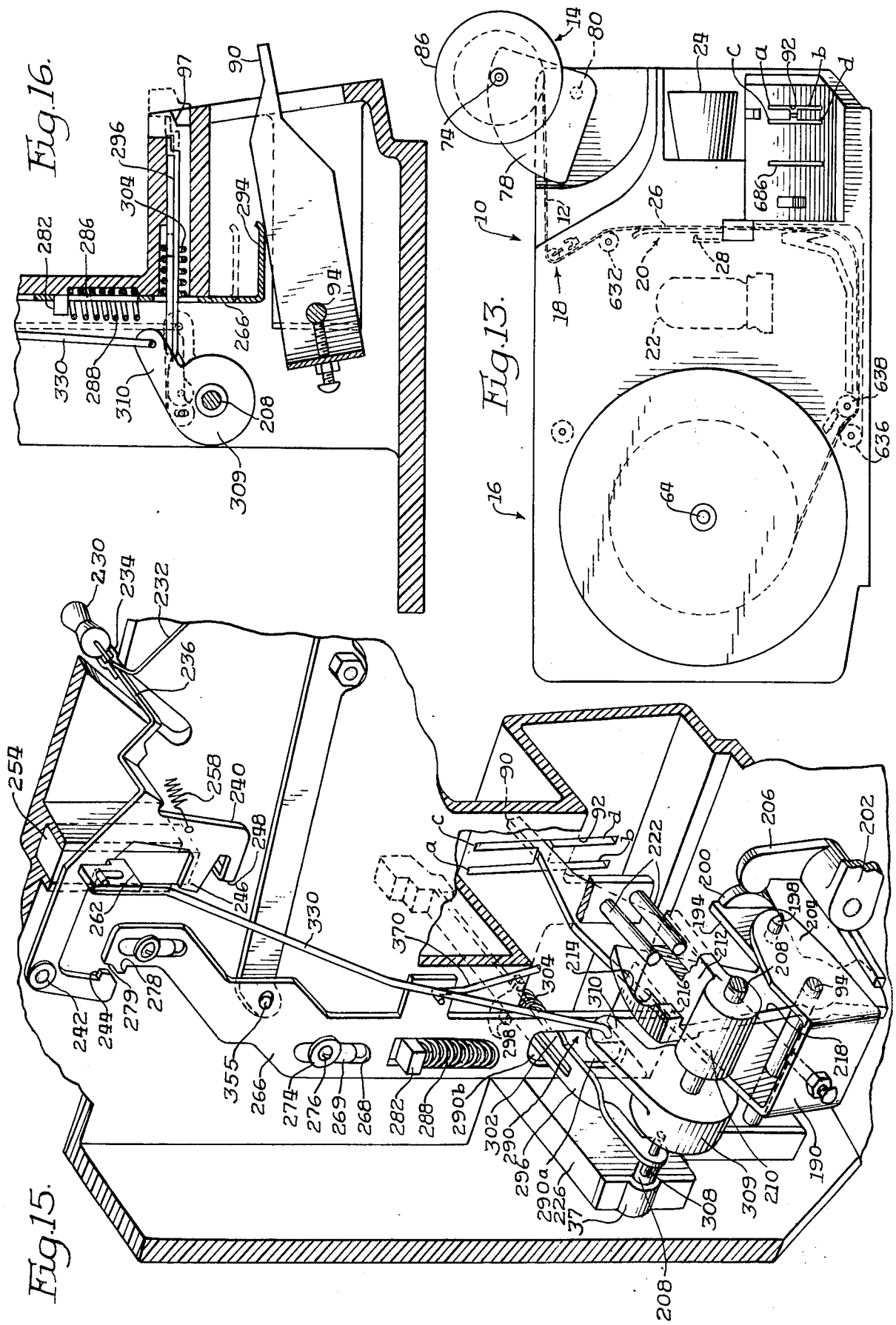

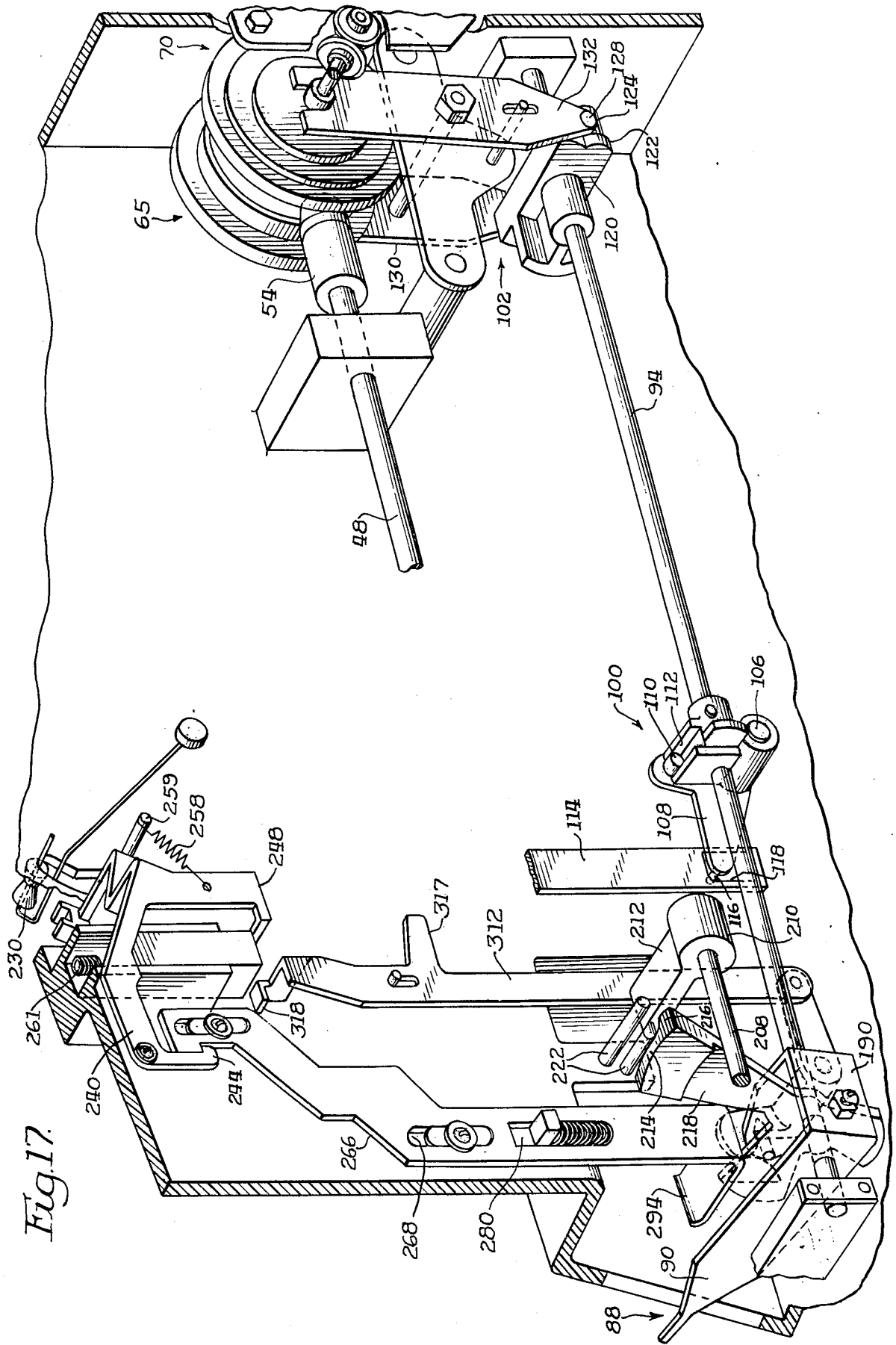

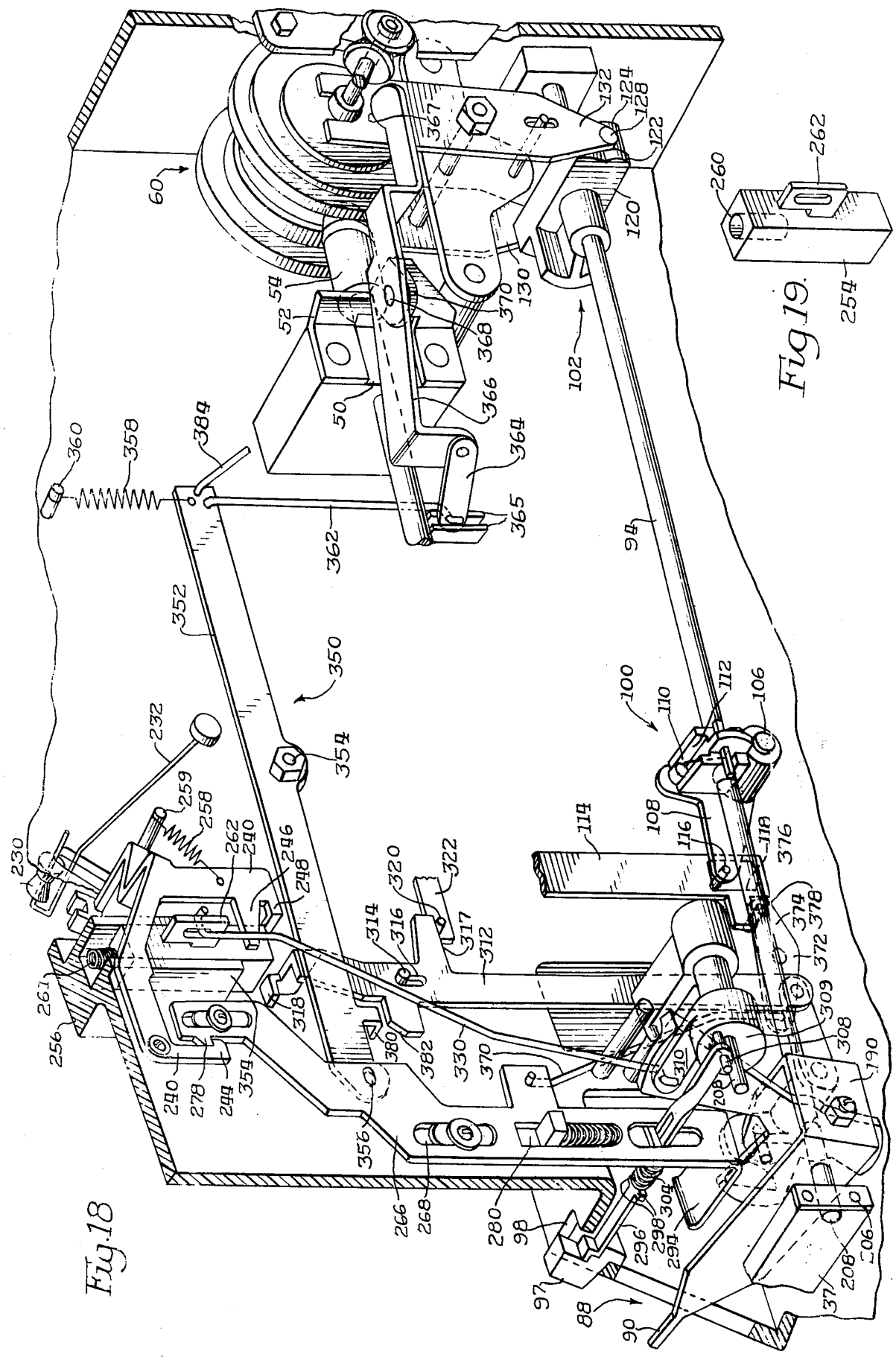

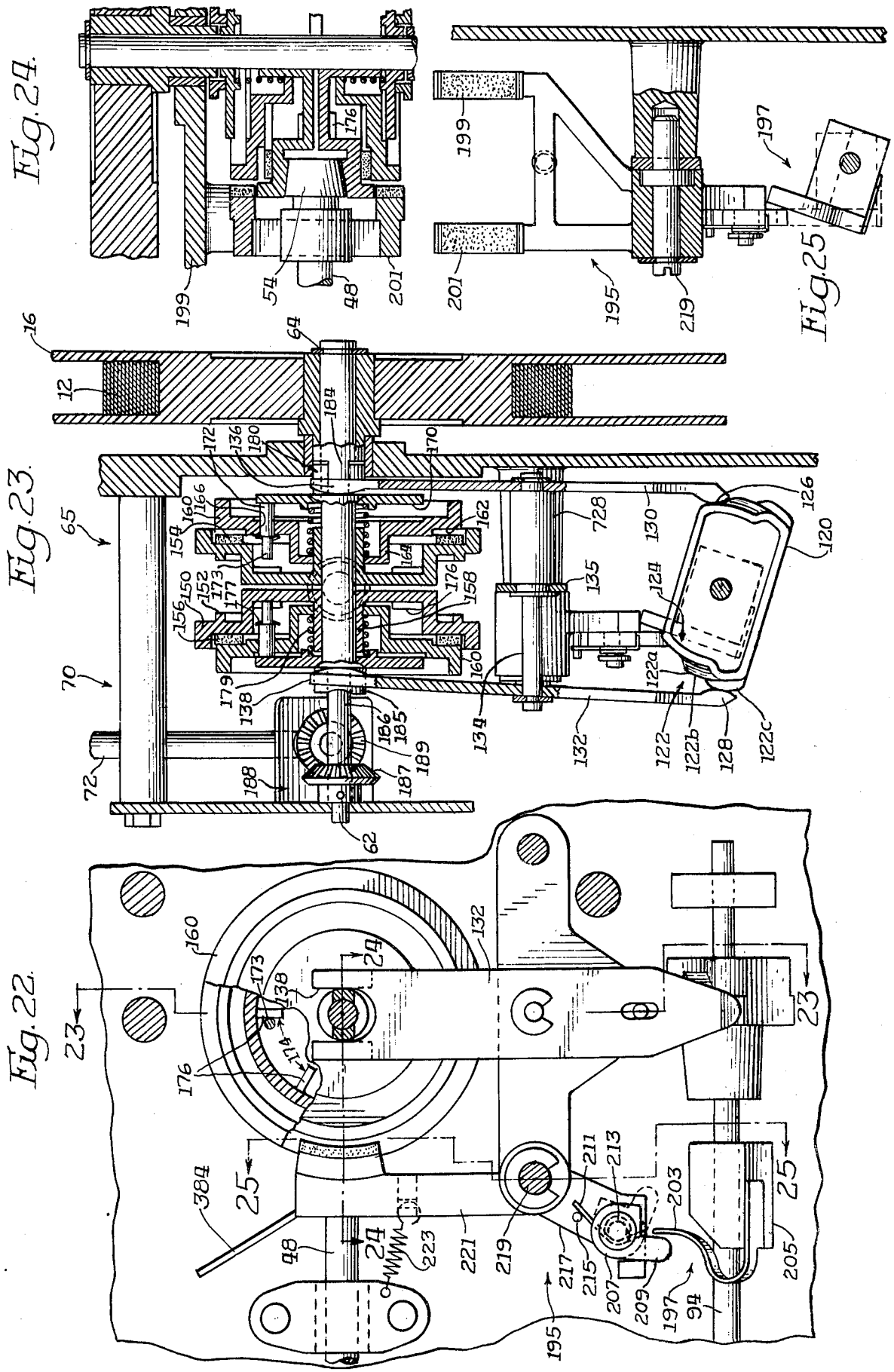

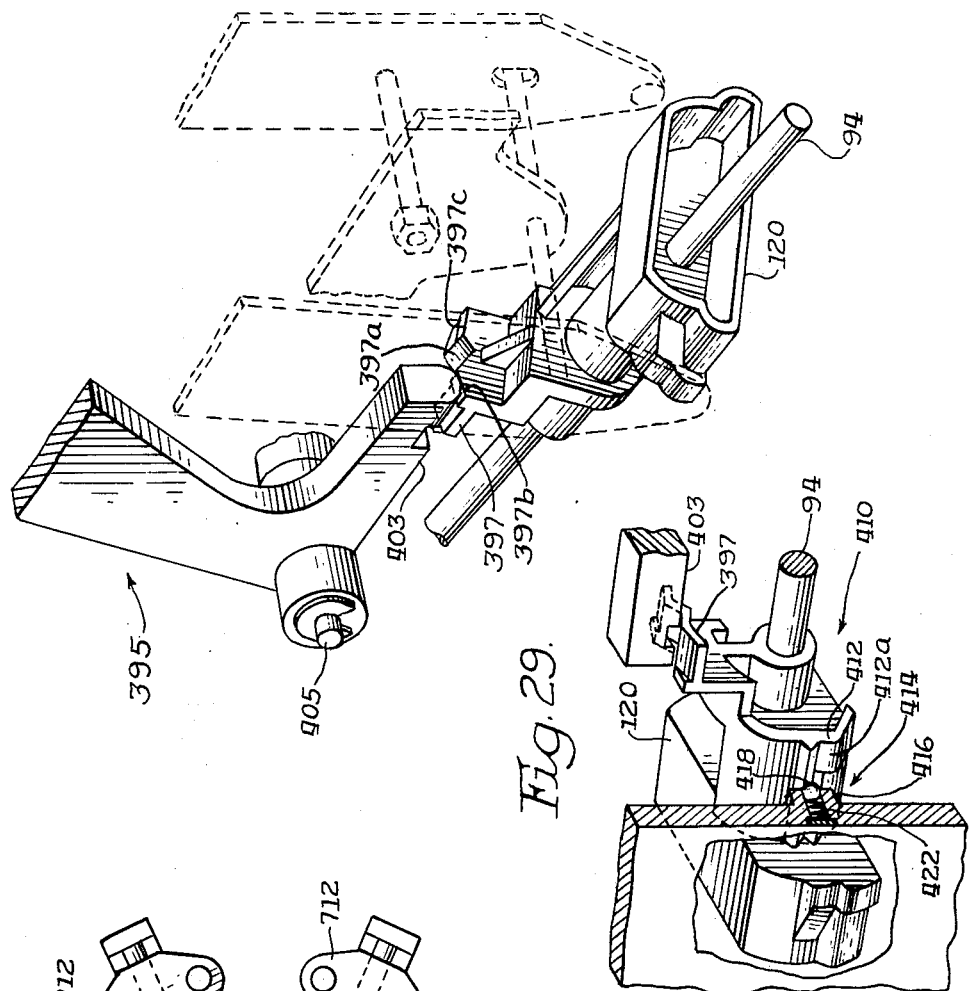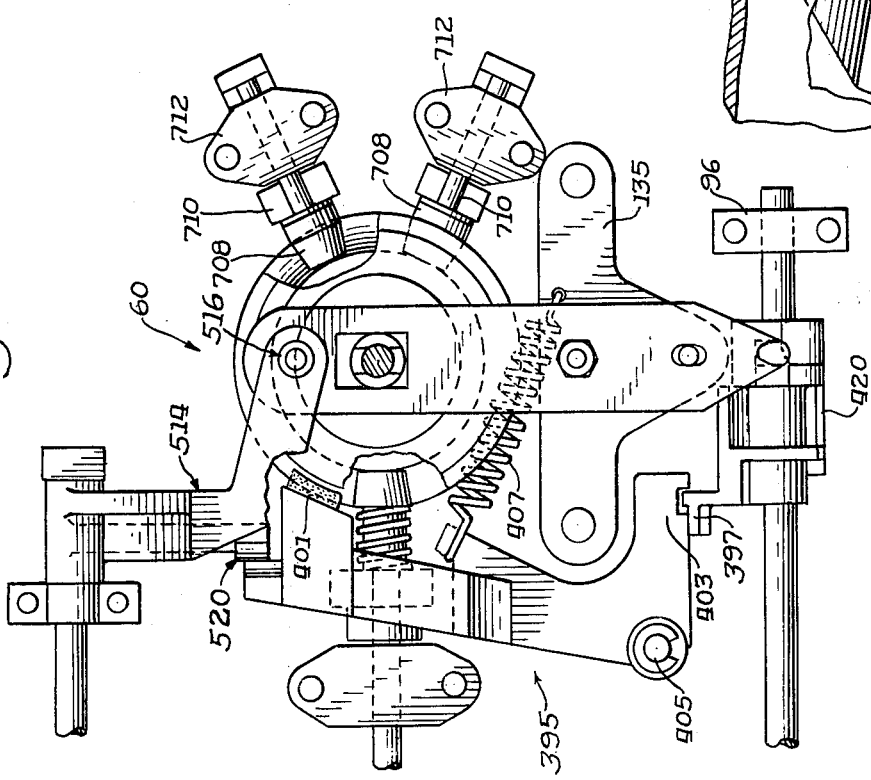

PROJECTOR AUTO REWIND MECHANISM

RELATED APPLICATIONS

The following U.S. patents and applications are related to this application and are assigned to the assignee of the present application: U.S. Pat. No. 4,097,132, filed Feb. 18, 1977, issued June 27, 1978; U.S. patent application Ser. No. 770,249, filed Feb. 18, 1977; and U.S. patent application Ser. No. 770,256, filed Feb. 18, 1977.

BACKGROUND AND SUMMARY OF THE INVENTION

The present invention relates generally to motion picture projectors and more particularly to a control arrangement for selectively actuating a rewind mode of operation upon the occurrence of a predetermined film tension condition.

Motion picture projectors normally include a forward and reverse film transporting drive assembly and a controller assembly which is manually movable into various positions for selecting corresponding operating modes. A motion picture projector of this type is described in U.S. Pat. No. 3,952,969 which issued to J. G. Woodier on Apr. 27, 1976.

During the normal forward projection mode and as the end of the film is reached, it is desirable to automatically cease the film transporting action and actuate a rewind mode of operation by sensing the occurrence of a predetermined film tension condition.

While motion picture projectors of the prior art have provided arrangements to cease film transporting and actuate a rewind mode of operation that are generally suitable for their intended purpose, these arrangements are either overly complex, unreliable or are not easily adaptable to the film drive and control mechanisms of projectors currently available. Further, many of the prior arrangements are not disabled during certain operational modes such as still, pause, fast forward and reverse where either high film tension normally occurs or the operator may inadvertently actuate the arrangement.

In accordance with the present invention, it is a principal object to provide an improved arrangement in a projector to automatically cease film transporting when a predetermined film tension condition occurs in predetermined operating modes and actuate a rewind mode of operation.

It is a further object of the present invention to provide a simplified and reliable arrangement to automatically actuate a rewind mode of operation in a projector upon the occurrence of a predetermined film tension condition and wherein the arrangement is conditioned to a sensing mode by the mode controller assembly of the projector and which ceases film transporting action by positioning of the mode controller assembly.

It is another object of the present invention to provide an arrangement to actuate a rewind mode of operation of a projector upon the occurrence of a predetermined film tension condition that includes a locking arrangement to inhibit operation in certain predetermined operational modes.

It is a still further object of the present invention to provide an automatic rewind arrangement in a projector that positions a mode controller assembly to a position where film transporting is deactuated and directly effects conditiong of a film transporting drive assembly of the projector.

It is yet another object of the present invention to provide an automatic rewind arrangement in a projector when a high tension film condition is detected that is easily adaptable to projector apparatus and avoids one or more of the above-described disadvantages of the prior art arrangements.

These and other objects of the present invention are efficiently achieved by providing a control arrangement to selectively actuate a rewind mode of operation upon the occurrence of a predetermined film tension condition in a projector provided with a forward and reverse film transporting drive assembly, an assembly for sensing a predetermined film tension condition and a manually moveable mode controller assembly for selecting various operational modes.

The selectively actuated rewind control arrangement includes a controller assembly conditioner mechanism that is responsive to the tension sensing assembly and effective to position the controller assembly from a first predetermined projector operating mode such as a normal forward mode to a second predetermined operating mode such as a still mode when the predetermined film tension condition is sensed. A rewind mode actuator mechanism responsive to the controller assembly conditioner mechanism is provided to control the film transporting drive assembly in the rewind mode upon the operation of the controller assembly conditioner mechanism.

The rewind mode actuator mechanism in one arrangement includes a translating member for converting a linear displacement of the controller assembly conditioning mechanism to a rotational movement which is connected to rotate a coupling rod member carrying a displacing actuator member. The displacing actuator member is arranged to displace a reverse drive assembly member actuator in the film transporting assembly to condition the film transporting assembly in a rewind mode.

In a second arrangement, a pivotable link converts the linear displacement of the controller assembly conditioning mechanism to a vertical displacement of a connecting rod that is coupled through a connecting pivot plate to pivot a reverse drive actuator member to displace the reverse drive assembly actuator.

The rewind mode actuator is also provided with actuator members to deactuate a gate and side tension mechanism of the projector in the rewind modes and to deactuate a shuttle mechanism.

BRIEF DESCRIPTION OF THE DRAWINGS

The invention, both as to its organization and method of operation, together with further objects and advantages thereof will best be understood by reference to the following detailed description taken in connection with the accompanying drawings wherein:

FIG. 3 is a sectional view taken along line 3—3 of FIG. 1;

FIGS. 4 and 5 are sectional views taken along lines 4—4 and 5—5 respectively of FIG. 2;

FIGS. 6 and 7 are sectional views taken along lines 6—6 and 7—7 respectively of FIG. 1;

FIG. 8 is an enlarged front elevational view of a portion of the projector housing taken from the line 8—8 of FIG. 1;

FIG. 9 is a top plan view taken from line 9—9 of FIG. 8;

FIGS. 10, 11 and 12 are sectional views taken along lines 10—10, 11—11 and 12—12 respectively of FIG. 1;

FIG. 13 is a pictorial schematic representation of a motion picture projector constructed in accordance with the principles of the present invention;

FIG. 15 is an enlarged fragmentary perspective view of the motion picture projector of FIG. 14;

FIG. 16 is a fragmentary side elevational view of the motion picture projector of FIG. 15;

FIG. 17 is a fragmentary perspective view of an alternative arrangement of the motion picture projector of FIG. 14 with certain parts omitted and parts broken away for clarity;

FIG. 18 is a fragmentary perspective view of the motion picture projector of FIG. 14 similar to FIG. 17 and illustrating further features of the present invention;

FIG. 19 is an enlarged perspective view of a pusher block element of FIG. 18;

FIG. 22 is an enlarged elevational view of portions of the motion picture projector assemblies of FIG. 20 illustrating important features of the brake and dual clutch drive assemblies of the present invention;

FIG. 23 is a sectional view taken along line 23—23 of FIG. 22 and illustrating features and details of the clutch and brake assemblies of the present invention;

FIG. 24 is a sectional view taken along line 24—24 of FIG. 22 and illustrating further details and features of the brake and clutch assemblies;

FIG. 25 is a view partly in section taken along and from line 25—25 of FIG. 22 and illustrating further details and features of the brake assembly of the present invention;

FIG. 27 is an elevational view of portions of the motion picture projector of FIG. 26 illustrating features of the brake and dual clutch drive assemblies of the present invention;

FIG. 28 is a perspective view of portions of the motion picture projector of FIG. 26 illustrating further features of the brake and dual clutch drive assemblies; and FIG. 29 is a perspective view of portions of the motion picture projector of FIG. 26 illustrating features of the brake, control and dual clutch drive assemblies of the present invention.

DESCRIPTION OF THE PREFERRED EMBODIMENT

Figure 14:
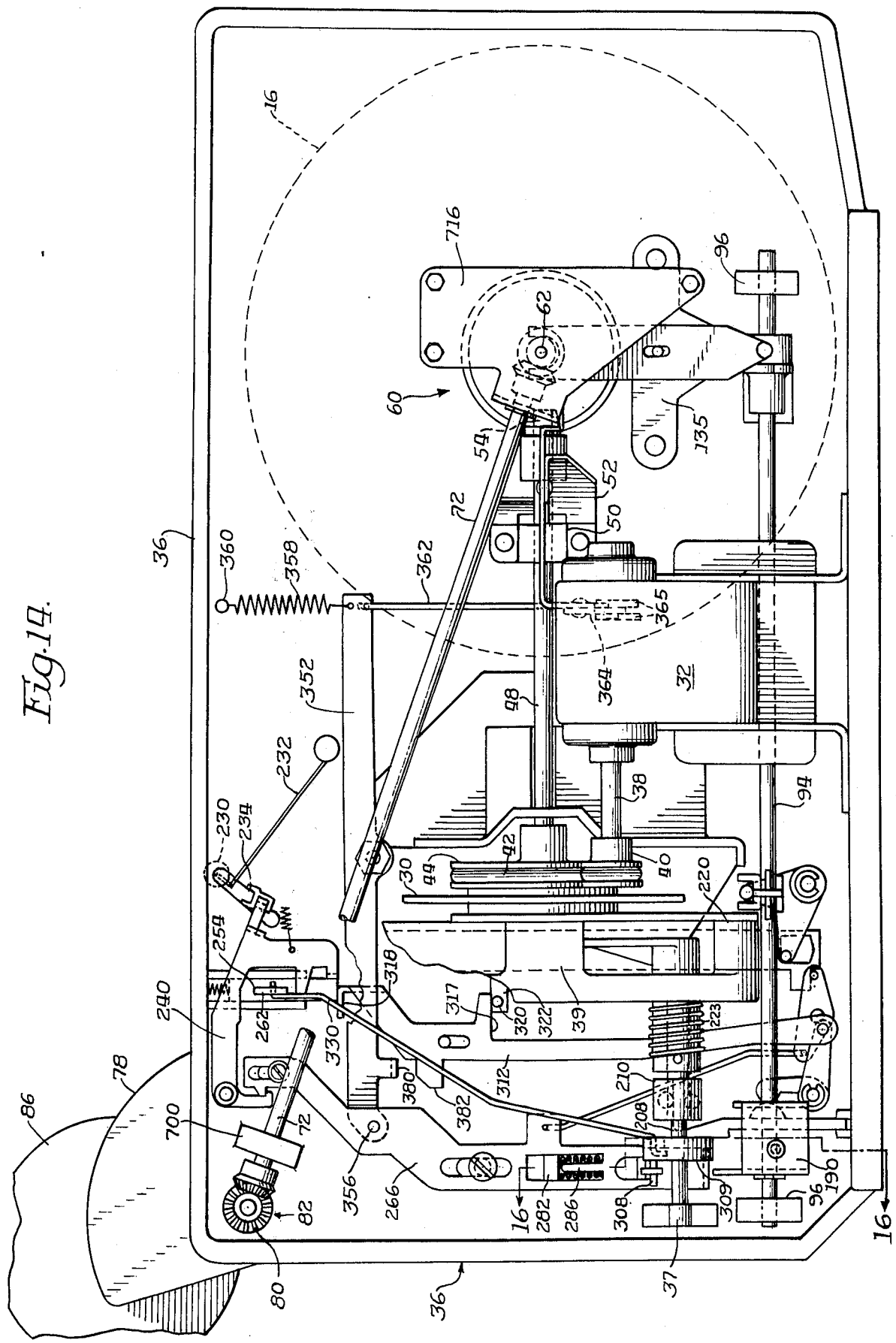
FIG. 14 is a rear elevational view of a motion picture projector constructed in accordance with the principles of the present invention.

Referring now to the drawings and particularly to FIGS. 13 and 14, a film or web handling apparatus such as a motion picture projector 10 has a path along which an elongated web or film 12, is transported between a supply device 14 and a take-up device 16. The supply device 14 is a conventional cartridge (not shown) or a supply reel and the take-up device 16 is a conventional take-up reel. The film movement path passes over a film tension sensor 18 and through a transducing station such as a projection station 20. In the case of a motion picture projector, the projection station 20 includes a projection lamp 22, a projection lens 24, and a gate 26 at which an intermittent film transporting mechanism or shuttle 28 is arranged. As best seen in FIG. 14, a shutter 30 is arranged to be rotated in synchronism with the movement of the shuttle 28 when powered by the prime mover of the projector.

The prime mover for driven components of the projector is an electrically energized motor 32 which is mounted in the housing or frame 36 of the projector 10 and includes an output drive shaft 38. A pulley 40 is fixed to an end of the drive shaft 38 of the motor 32 and a belt 42 is arranged to drive a cooperating pulley 44 which is fixed to a driven shaft 48. The driven shaft 48 is supported in bearings 50 extending from a mechanism support plate 52 of the housing 36 and carries the shutter 30 and a drive (not shown) for the shuttle 28. The elongated driven shaft 48 extends from the vicinity of the shuttle 28 and the shuttle 30 toward the vicinity of the take-up assembly 16. A friction driver or snubber 54 is affixed to the driven shaft at the end near the take-up assembly 16 as best seen in FIGS. 17 and 18. The motor 32 is a unidirectional drive device and thus the driver 54 is unidirectionally rotated as well. The drive shaft 38 also extends through the motor 32 opposite the pulley 40 and carries a ventilation device such as a fan blade (not shown).

Internally of the projector housing 36, and associated with the operation of the supply device 14 and the take-up device 16 is a dual clutch drive assembly 60. The components of the dual clutch drive assembly 60 are arranged axially on a shaft 62 for rotation about and limited movement along the shaft. A take-up spindle 64 is supported on the outer end of the shaft 62 for releasably receiving the take-up device 16. A first forward drive subassembly of the dual clutch assembly 60 referred to generally at 65 (FIG. 17) is selectively coupled to the spindle 64 such that the take-up device 16 may be in one of three operational states; free, frictionally driven (slip), or positively driven. Internally of the projector housing 36, the shaft 62 of the dual clutch drive assembly 60 supports a second reverse drive subassembly referred to generally at 70 (FIG. 17) which is operable in the same three conditions or states. The operational state for both subassemblies 65 and 70 is determined by the operating mode of the projector 10 according to the position of a control lever selector 90, FIGS. 15, 17 and 18, as will be explained in more detail hereinafter. A drive shaft 72 connects the reverse drive subassembly 70 to the supply device 14.

As seen in FIGS. 13 and 14, the supply assembly 14 in a specific preferred embodiment includes an externally arranged reel supporting spindle 74 mounted on an arm 78 pivoted about a shaft 80 through which a bevel gear pair 82 couples the supply shaft 80 to the drive shaft 72. A supply spindle drive mechanism (not shown) internal to the arm assembly 78 drivingly couples the shaft 80 to the supply spindle 74. The gear arrangement 82 enables the spindle 74 to be driven responsive to rotation of the reverse drive subassembly 70 in the reverse or rewind (fast reverse) modes and allows the withdrawal of film 12 from the supply reel 86 in the forward mode of operation. For film transport during normal forward projection, the reverse drive subassembly 70 of the dual clutch drive assembly 60 is not engaged. Thus, the drive shaft 72 and the supply spindle 74 are free to be rotated as required for withdrawal of film from the supply reel 86. The take-up spindle 64 is frictionally driven in the forward mode to wind up the film being withdrawn from the supply assembly 14 by the shuttle 28. The drive components 70, 72, 82 and the supply spindle drive mechanism through which the supply spindle 74 is driven provide a speed reduction and a slight drag to reduce the possibility of film "spillage."

In the reverse projection mode, the reverse drive subassembly 70 is frictionally coupled to and driven by the dual clutch drive assembly 60 in the slip state to cause the supply spindle 74 to be operated in a tendency drive condition. The supply reel 86 and the spindle 74 rotate to wind up film as the shuttle 28 pulls film from the take-up reel 16 on which the film supply is wound. Correspondingly in the rewind mode, the reverse drive subassembly 70 is positively driven by the dual clutch drive assembly 60 to operate the supply spindle 74 in a positively driven rewind speed condition.

Conditioning of the projector 10 to the several operational modes is obtained through a mode controller assembly referred to generally at 88 (FIGS. 17 and 18) and including the control lever selector 90 which is arranged for manual actuation. The controller assembly 88 is described in more detail in U.S. Pat. No. 3,952,969 to which reference may be made. The end of the control lever 90 passes through an "H" shaped slot 92 in the projector housing 36 thereby permitting the lever 90 to be shifted from a pause mode or a still projection mode at opposite ends of the cross bar of the "H" to the ends of the legs of the slot 92. As the lever 90 is shifted in the slot to the ends of different legs thereof, referred to as orientations "a," "b," "c" and "d," (FIG. 13) the projector 10 is caused to operate in selected operational modes. As shown in FIGS. 13 and 15, positions "a" and "b" provide respectively for normal forward and reverse projection modes. Positions "c" and "d" provide respectively for a fast forward mode and a fast reverse or rewind mode which are also commonly referred to as search modes. The cross bar position between positions "a" and "b" is referred to as the still projection mode and the cross bar position between the "c" and "d" positions is referred to as the pause mode.

From within the projector housing 36, and as best seen in FIGS. 15 through 18 and 20, the control lever 90 is positioned about an axis defined by a control rod 94 by a combination of pivoting (rotational) and lateral shifting (linear axial) movements. The control lever 90 is fixedly connected to the control rod 94 to prevent simultaneous rotation about and longitudinal shifting along the rod 94. The rod 94 is supported slidably and pivotally in bearing members 96 fixed to the housing 36 of the projector.

A safety interlock button 97, best seen in FIG. 16, is provided in a specific embodiment above the control selector lever 90 and extending through a slot 98 (FIG. 18) in the projector housing 36. The safety interlock button 97 when in a first outwardly extended position is effective to inhibit the selection of the fast forward mode by restraining the selector lever 90 from being positioned to the "c" orientation. When the safety interlock button 97 is depressed to a second inward position, the selector lever 90 is then positionable to the fast forward position.

Axially spaced along the control rod 94 are motion translating components including a gate and side tension control assembly 100 and a clutch control assembly 102, FIGS. 17 and 18.

The gate and side tension control assembly 100 includes an offset axle stub 106 extending from the housing 36 which pivotably supports a plate 108. A stub 110 extends from the plate 108 into a control sleeve 112 fixed to the rod 94. As the rod 94 is shifted longitudinally (axially), the sleeve 112 is caused to move axially therewith. As the sleeve 112 shifts due to axial movement of the control rod 94, the plate 108 is pivoted about the axis 106. A vertically disposed connecting link 114 (FIGS. 17 and 18) of the gate and side tension control mechanism 100 is displaced from a first vertical position to a second vertical position upon the pivoting of the plate 108 by a pin 116 which extends from the rotated end of the plate 108 and engages the connecting link 114 in an enlarged slot 118 formed therein. The slot 118 is dimensioned to permit movement of the link 114 in either of the axially displaced conditions of the control rod 94 and the control assembly 100 for a purpose to be described hereinafter. The lower position of the connecting link 114 causes the gate 26 (FIG. 13) to be closed and side tension to be applied to the film at the gate 26. The upper position causes the gate to be open and the side tension to be removed, a condition which is desirable for the high speed film transport operation in the fast forward mode and the fast reverse or rewind mode.

Considering the clutch control assembly 102, as the control rod 94 shifts longitudinally (as the control lever selector 90 is shifted longitudinally between the still and the pause positions across the center cross bar of the "H" pattern) a double sided-double track cam 120 (FIG. 23) fixed to the rod 94 is shifted selectively to align one of the two cam tracks 122 or 124 with cam follower portions 128 and 126 respectively which are formed on a reverse drive clutch actuator 132 and a forward drive clutch actuator 130. The reverse drive clutch actuator 132 conditions the reverse drive subassembly 70 and the forward drive clutch actuator 130 conditions the forward drive subassembly 65. The cam member 120 in a specific embodiment is fabricated as a unitary element and fitted over the control rod 94 to be retained thereon. When the rod is in one position, e.g., to the left in FIGS. 17 and 18, the cam track 124 is the operating cam, whereas when the rod is to the right, cam track 122 is the operating cam. As best seen in FIG. 23, the clutch actuators 130, 132 are mounted for pivotable movement about an axis through a stub shaft 134 fixed on the housing 36 by a support platform 135. As each actuator is displaced pivotably in response to rotation of the dual cam member 120, the drive subassemblies 65 and 70 of the dual clutch drive assembly 60 are shifted from a first operational state to another operational state to selectively transmit power from the friction driver input 54. A fork end 136, 138 of the respective actuators 130, 132 causes displacement of portions of the clutch assembly as the fork end 136 or 138 is caused to engage a respective clutch member responsive to the orientation of the dual track cam member 120.

In each of the substantially identical drive subassemblies 65 and 70 of the dual clutch drive assembly 60, (FIG. 23) a drive disc 150 is supported on the spindle shaft 62 for substantially free relative rotation. Near the periphery on one surface of the drive disc 150 is formed a slightly raised rim 152 for engaging the friction driver 54 on the driven shaft 48. Extending axially from the opposite surface of the drive disc 150 is formed a rim 154 relative to which a ring of friction material 156 is arranged. About the shaft 62, the disc has an extended hub portion 158 for maintaining alignment of the drive disc 150 during axial sliding movement along the shaft.

Cooperating with the drive disc 150 and particularly with the friction ring 156 is a clutch plate 160. The clutch plate 160 is provided with an annular recess 162 proximate the perimeter on one surface for engaging the friction ring 156 along the surface opposite the drive disc 150. About the shaft 62, the clutch plate 160 has an offset portion 164 which rides on the extended hub 158 of the drive disc 150 and can be rotated either therewith or relative thereto. Approximately midway of the radial extent of the surface of the clutch plate 160, a series of holes 166 are formed for coupling of a driven disc 170.

The driven disc 170 is formed with a number of legs 172 extending perpendicularly from one surface thereof. The number of legs and the arrangement thereof is selected to cooperate with the holes 166 of the clutch plate 160. Along most of their length, the legs 172 are dimensioned to fit snuggly but slidably in the holes 166. For a short length 173 from the remote end of the legs 172, the legs are reduced slightly in diameter to fit into one of several receiver slots 174 formed in the adjacent surface of the drive disc 150. The slots 174 are formed by the space between a plurality of ribs 176 arranged on the surface of the drive disc 150 to be engaged by the legs 172. After assembly of the above described parts, a washer 177 is frictionally fitted on each of the legs 172 to limit relative axial movement between the driven disc 170 and the clutch plate 160 and ensure engagement of the legs 172 with the clutch plate 160.

The driven disc 170 of the forward drive subassembly 65 is provided with a hub 180 which is dimensioned to rotate freely of the shaft 62. In the end of the hub 180, a slot 182 is provided for cooperating with a mating key member 184 extending from the take-up spindle 64. The opposite driven disc 170 of the reverse drive subassembly 70 is provided with a semicircular slotted split hub portion 185 which is also dimensioned to rotate freely of the shaft 62 and cooperates with a mating sleeve 186 which extends from one gear 187 of a bevel gear pair 188. The second bevel gear 189 of the gear pair 188 is connected to the drive shaft 72.

Thus when assembled, the driven disc 170 is positively and continuously coupled to the drive shaft 72 and the supply spindle 86 whether or not the disc 170 is in a driven state. The driven disc 170 is only positively driven when the legs 172 engage the slots 174 in the drive disc 150. A coil spring 179 is arranged about the hub 158 of the drive disc 150 for urging or biasing the driven disc 170 away from the clutch plate 60. Consequently, the legs 172 are also normally urged away from the drive disc 150.

In operation, when one of the clutch actuators 130, 132 is displaced from a first condition to a second condition, the clutch plate 160 is shifted axially overcoming the force of the spring 179 and approaching the drive disc 150. In a condition of partial displacement of the driven disc 170 toward the drive disc 150, as in the forward drive assembly 65 in FIG. 23, the clutch plate 160 is urged with a slight pressure toward the drive disc 150. However, the legs 172 are not moved into engagement in the slots 174 of the drive disc 150 although the spring 179 causes drive transmission through the friction disc 156. In this condition, the drive from the driven shaft 48 causes the clutch plate 160 to be tendency driven but permits slippage to occur if the take-up spindle 64 is slightly restrained. This condition is employed when the projector is in the normal forward projection mode with the forward drive clutch actuator 130 tilted or pivotally displaced a relatively small amount by the cam surface with which it is engaged.

Referring to FIG. 23, the cam tracks 122, 124 have three levels, for example, 122a, 122b, 122c which are each respectively engaged by the cam follower 126, 128 as determined by the orientation of the cam member 120. The level 122c is the high level causing positive drive of the reverse drive clutch subassembly 70 as shown by the displacement of the reverse cam follower 128 of the reverse drive clutch actuator 132 to the left in FIG. 23. The level 122a is the low level condition in which the clutch is not actuated but remains free. When the level 122b displaces the cam follower 128, the middle position, the driven disc 170 is in the tendency or slip condition discussed hereinabove.

Thus, the orientation "c" fast forward, pause, and "d" fast reverse of the control selector lever 90 correspond respectively to the cam positions 122a, 122b and 122c for the reverse cam follower 126. The cam track 124 is arranged to displace the reverse cam follower 128 to the tendency or slip condition when the control selector lever 90 is in the "b" position and to the free condition when the control selector is in the still or "a" position. Similarly, the cam track 124 is arranged to displace the forward cam follower 126 to the tendency or slip condition when the control selector lever 90 is in the "a" position and to the free condition in the still and "b" positions.

Summarizing the condition of the dual clutch drive assembly 60 in the various projector operational modes, for forward projection, control selector orientation "a," the forward cam follower 126 is displaced to select a tendency (slip) drive condition for the take-up spindle 64 while the reverse cam follower 128 permits a free drive condition for the supply spindle 74. In the reverse projection mode, the supply spindle 74 is in a tendency or slip drive condition and the take-up spindle 64 is in a free condition. The take-up spindle 64 is positively driven in the fast forward mode and the supply spindle 74 is free, while for the rewind mode, the supply spindle 74 is positively driven and the take-up spindle is free. As the control selector lever 90 passes through the pause position, the tendency drive condition is established for both the supply and take-up spindles. Reference may be made to U.S. Pat. No. 3,952,969 referred to hereinbefore for a more detailed description of the dual clutch drive assembly 60.

In accordance with an important aspect of the present invention and referring to FIGS. 20 through 25, a brake assembly 195 best seen in FIG. 22 is provided in a specific embodiment to prevent film spillage and to stabilize the dual clutch drive assembly 60. The brake assembly 195 is controlled by a brake cam arrangement 197 carried by the control rod 94. The brake assembly 195 includes a double brake shoe arrangement 199, 201 which engages the rim portions of the clutch plates 160 when the control selector 90 is moved from either the fast forward "c" position or the fast reverse "d" position into the pause position at the center of the "H" pattern between the "c" and "d" positions. The double brake shoe arrangement 199, 201 also engages the rim portion of the clutch plates 160 when the control lever selector 90 is moved from the still center slot position of the "H" pattern to the pause position. In an alternate embodiment the brake arrangement is actuated only when the control lever selector is moved from the still to pause positions.

In accordance with further important aspects of the present invention, the brake cam arrangement 197 includes a cam member 203 extending upwardly from a cam body member 205 which is fixed to the control rod 94 so as to pivot and rotate with the rod 94. The cam member 203 is disposed in an operative contact position with a pivoted cam follower disc 207 when the control rod 94 is positioned in the right laterally shifted position corresponding to the pause position of the control selector 90. The cam follower disc 207 includes an extending follower arm 209 that is contacted by the cam member 203. A spring 211 is coiled about a pivot pin 213 of the cam follower disc 207 and applies force to an extending pin 215 of a lower arm 217 of the brake assembly 195 that is pivoted about a pivot pin 219. Rotation of the lower arm 217 also rotates an upper arm 221 of the brake assembly 195 that carries the double brake shoe arrangement 199, 201. The upper arm 221 is biased in the "off" brake position of the brake shoes 199, 201 by a spring 223 extending between the upper brake arm 221 and a mounting plate attached to the housing 36.

In operation, when the cam member 203 pivots the cam follower arm 209, disc 207 and arms 217 and 221, the double brake shoe arrangement 199, 201 is engaged to rapidly slow operation of the rotating clutch plates 160 corresponding to either the fast forward or the rewind mode. This braking action takes place as the control selector 90 and the control rod 94 rotate from either the fast forward or rewind position to the pause position. In accordance with important aspects of the present invention, the braking action prevents film spillage and promotes stabilization during rapid mode selection when operating the projector in the search modes, the fast forward and rewind (fast reverse) modes.

Figure 20:
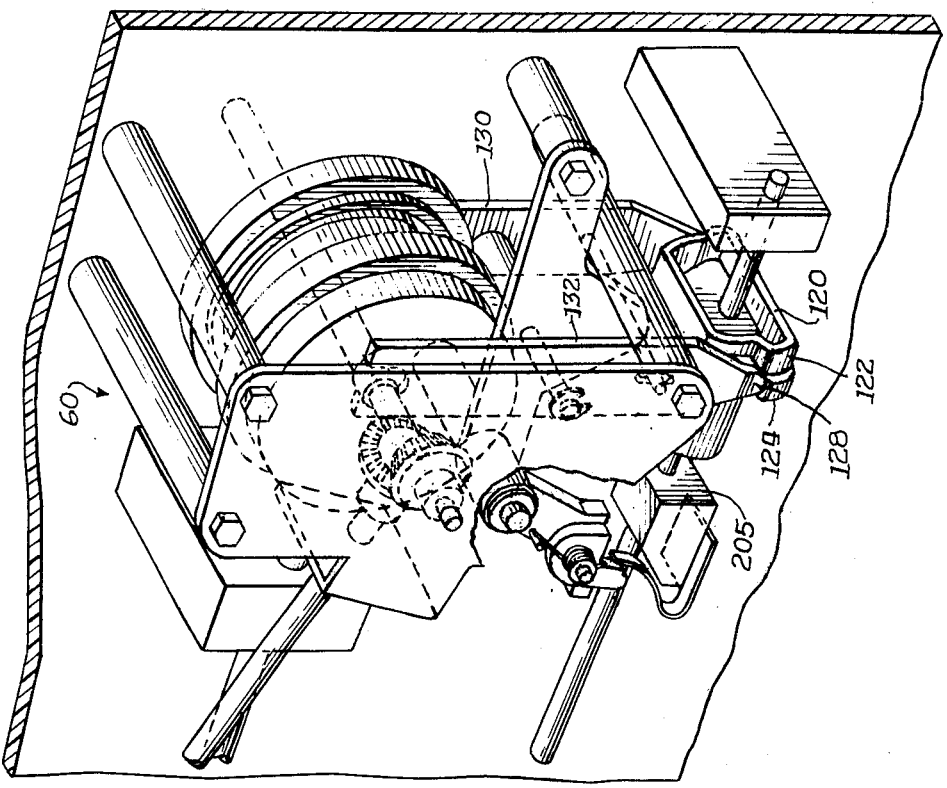
FIG. 20 is a fragmentary perspective view of portions of the motion picture projector of FIG. 14 illustrating features in the areas of the drive, control, and brake assemblies of the present invention.
Figure 21:
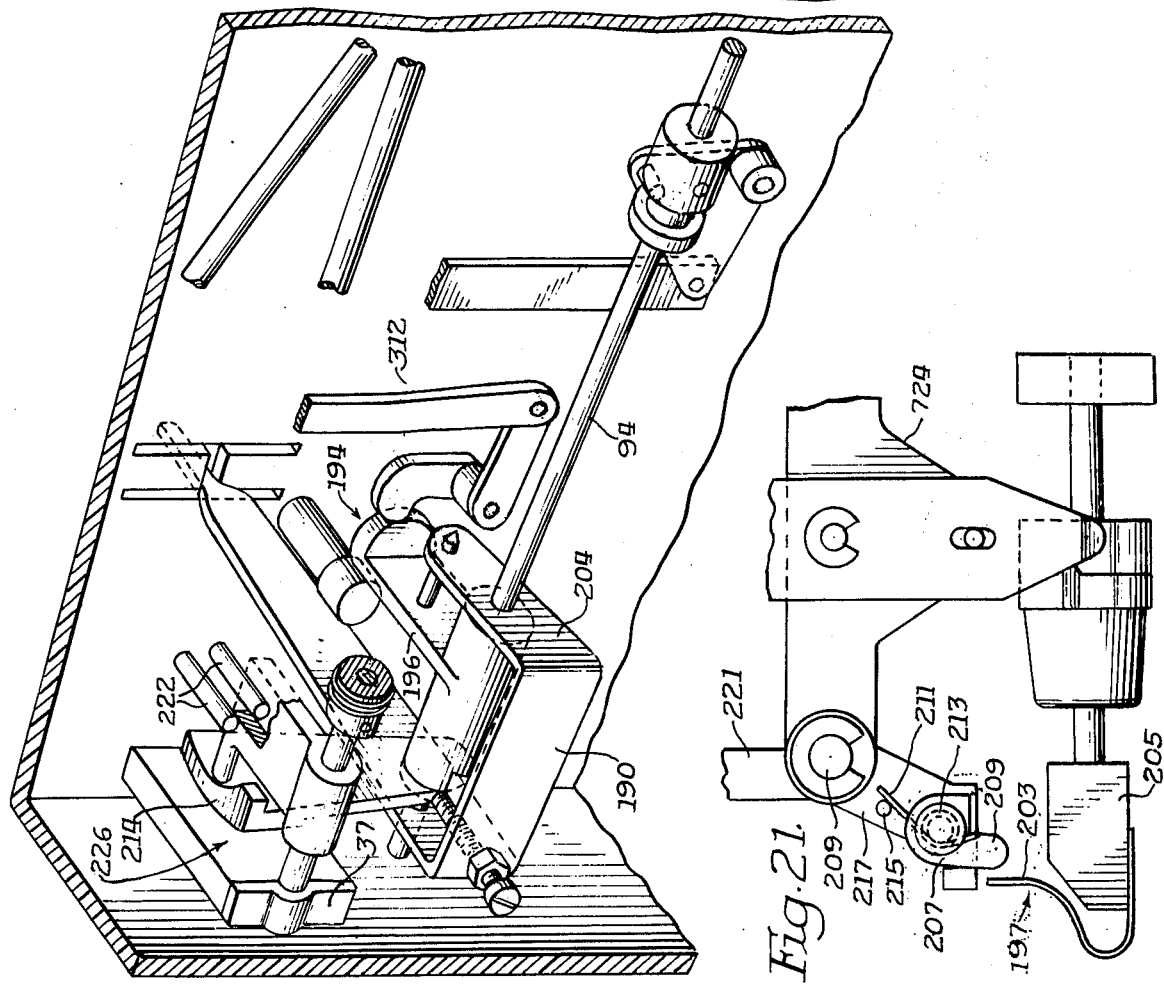
FIG. 21 is an enlarged elevational view of portions of the motion picture projector assemblies of FIG. 20.

The mode controller assembly 88 is arranged to translate the movements of the control lever 90 within the "H" slot to operational movements of components of the projector 10. The control assembly 88 is pivotally and axially movable about the axis through control rod 94. As best seen in FIGS. 15 and 20, the control lever 90 is an extension of a U-shaped frame 190 fixed to the control rod 94.

A shuttle retractor and reversal mechanism actuator 194 as best seen in FIGS. 15 and 20, is positioned for operation adjacent the frame 190. Extending radially from the actuator 194 is a bar member 196 from which extends a pin 198 and a shuttle retractor engaging foot portion 200. An arm 204 of the U-shaped frame 190 opposite the lever arm portion 90 is provided with a pin receiving aperture through which the pin 198 can be passed. When the pin 198 is inserted into the arm 204, the frame 190 and the actuator 194 are coupled for pivotal movement. This combined pivoting action of 190 and 194 occurs only when the mode controller 88 is in the normal projection modes, forward and reverse, represented by positions "a" and "b." As the actuator 194 pivots, the foot portion 200 is removed from engagement with a rounded portion of a shuttle retractor actuator link 206. The control rod 94 passes through a hole in the actuator 194 which is dimensioned so the rod 94 rotates freely of the actuator 194. The actuator 194 is positioned and supported at the lower end between housing portions 191 and 193 by the rod 94 and at the upper end between a housing portion 192 and a shuttle reversal sleeve 210.

When the controller 88 is shifted axially from the pin engaged condition of the actuator 194, the pin receiving arm 204 is moved away from the pin 198 of the actuator. In this condition, for the pause, fast forward and fast reverse modes, the frame 190 is pivotable independently of the actuator 194. That is, the shuttle retractor engaging foot portion 200 is not removed from alignment with the retractor link 206 thereby maintaining the shuttle assembly 28 retracted and inoperative as will be explained in detail hereinafter.

An elongated shuttle retractor link 312 (FIG. 18) is connected at one end to the shuttle retractor actuator 206 and extends to the vicinity of a release arm 240. The shuttle retractor actuator 206 is rotatably carried by a pin 202 extending from a housing stud 224. As the shuttle retractor actuator 206 rotates about pin 202, the shuttle retractor link is displaced vertically. The retractor link 312 is guided for movement by a pin 314 extending through a slot 316 formed in the retractor link 312. The retractor link 312 includes an extending cam arm 317 in the vicinity of the slot 316 to engage along its bottom edge an extending pin 320 of a shuttle retractor mechanism 322. The shuttle retractor mechanism arm 322 is pivotally biased to an upper position and is effective to retract the shuttle mechanism 28 and position a fire shutter (not shown) over the projector aperture at the projection station 20 when the mechanism arm 322 is moved to the lower position by camming arm 317 in response to movement of the retractor actuator 206. The shuttle 28 is in an operable position and the fire shutter is retracted when the arm 322 is in its upper position. The retractor link 312 further includes a foot 318 positioned at the top end of the retractor link 312 which engages a release locking assembly as will be explained in more detail hereinafter.

Adjacent the frame 190, generally parallel to the control rod 94 and extending from the housing 36, is a shaft 208 on which a shuttle reversal sleeve 210 is fixedly mounted. The shaft 208 is slidably supported in a bearing 37 carried by a housing extension 226 and a mechanism support plate 39. A plate 212 extends from the sleeve 210 and carries a cam follower 214. The cam follower 214 engages a cam track 216 which is formed on a wing portion 218 extending from the actuator 194. The shaft 208 and affixed sleeve 210 are caused to move by engagement of the cam follower 214 against the cam surface 216. The actuator 194 including the foot portion 200, the wing portion 218, and the cam surface 216 are restrained against axial movement. As the "U" frame 190 is pivoted for example to the reverse or "b" position, the high point of the cam track 216 is similarly pivoted causing the sleeve 210 and the shaft 208 to be displaced axially to the right in FIG. 14. The plate 212 is precluded from pivotal movement by being positioned between a pair of fixed guide posts 222 extending from the housing 36. Thus, when the high portion of the cam section 216 is aligned with the cam follower 214, the sleeve 210 is caused to move axially thereby displacing an associated shuttle reversal control generally referred to at 220 from a first forward condition to a second reverse condition. Upon return of the low cam section of the cam surface 216 to a position of cam follower engagement, a spring 223 positioned about the reversal control 220 urges the sleeve 210 toward the position as shown in FIG. 14.

Referring now to FIGS. 13, 15 and 18 and in accordance with further important aspects of the present invention, an automatic stopping feature, auto-stop, is actuated in response to tension in the film 12 along the film path and an additional automatic rewind feature, auto-rewind is actuated in response and further to the auto-stop condition in a specific embodiment. The trailing end of the film is attached to the hub 74 of the supply reel 86 so that at the end of a forward projection sequence, the end of the film is not pulled from the hub by the continued action of the shuttle 28 in the forward mode. Along the upper portion of the film path, intermediate the shuttle 28 and the supply reel 14, the film 12 passes over the film tension sensor 18 causing a roller 230 supported yieldably on a pivotally mounted spring wire 232 to be displaced according to the tension in the film. During the forward projection sequence, the roller 230 moves lightly up-and-down as the shuttle intermittently engages the film and pulls a predetermined length of film from the supply reel 86. However, as the tension in the film increases at the end of a projection sequence to a predetermined tension condition, the roller 230 is rotated or displaced downwardly a sufficient amount to actuate the sequence to cease film transporting.

The spring wire 232 supporting the roller 230 passes across a cradle 234 formed on an arm 236 extending from a release arm 240 which is mounted pivotably about a pin or shaft 242 that is fixed to a housing portion. The release arm 240 is provided with a release finger portion 244 located below the pivot point 242 and opposite the cradle arm 236. The release arm 240 is also provided with two additional fingers 246 and 248 arranged on the right side of the pivot pin 242 along a downwardly extending portion of the release arm 240. The higher positioned finger 246 of the two lower fingers provides a guiding surface for a displaceable pusher block 254 as it moves within a receiver slot 256 formed in the housing 36. Depending upon the position of the block 254, the lower finger 248 of the release arm 240 is either free of engagement with the block thereby permitting pivotable movement of the release arm 240 or engages the block to prevent movement of the arm 240 as will be explained in more detail hereinafter. A spring 258 is connected between the release arm 240 and a pin 259 extending from the housing 36 to urge or bias the release arm 240 in a counterclockwise direction. The pusher block 254 (FIG. 19) also includes a circular spring receiver depression 260 in the top surface of the block 254 to receive a coil spring 261 positioned between the block and the top surface of the housing to urge the block 254 in a downward direction. A rod receiver plate 262 extends from the pusher block 254 and includes an elongated slot.

An elongated trip arm 266 cooperates with the release arm 240 and the control lever 90 for stopping the operation of the projector 10 during the normal forward projection mode of operation upon the occurrence of a predetermined film tension condition. The trip arm 266 (FIG. 15) is provided with an elongated slot 268 in which is arranged an extending support plate 269 of the housing for guiding the trip arm 266 upon longitudinal vertical movement. The trip arm 266 is held against the support plate 269 by a washer 274 and a screw 276 threaded into the support plate 269. The trip arm 266 is capable of movement from one vertical limit to another restricted by the support plate 269 and the screw 276. At the upper end of the trip arm 266, an offset ledge 278 is provided for engagement with the finger 244 of the release arm 240 when the trip arm 266 is moved into a raised reset position. The trip arm 266 is moved vertically by the engagement of a foot portion 294 (FIGS. 17 and 18) against the controller handle arm 90 of the U-shaped frame 190 upon rotation of the frame 190. The trip arm 266 also is provided with a rectangular slot 280 below the slot 268 through which a lug 282 extends from the housing 36. A tab 286 extends from the lower edge of the slot 280 and serves as a restrainer for maintaining a spring 288 coiled therein between the bottom edge of the slot and the bottom of the lug 282. The spring 288 is arranged to bias the trip arm 266 downwardly from a first reset position shown in phantom in FIG. 16 to a second, tripped or release position as shown in FIG. 16.

An elongated lockout member 296 (FIG. 15) passes through a third slotted portion 290 located in the trip arm 266 above the foot portion 294. In a specific embodiment, provided at a predetermined position along the length of the lockout member 296 are a pair of tabs 298 (FIG. 18) and a widened limit wing portion 302 (FIG. 15). The slotted portion 290 of the trip arm 266 is dimensioned to a first width 290a throughout the lower portion which is comparable to the width of the lockout member 296 and to a second width 290b throughout the upper portion which is comparable to the width of the limit wing portion 302 of the lockout member 296. A spring 304 (FIG. 16) disposed along the lockout member 296 between the tab 298 and the limit wing 302 urges or biases the lockout member 296 outwardly or externally.

The external end of the lockout member 296 is provided with a safety interlock control button 97 (FIG. 16) by which the lockout member 296 may be displaced from a first external position to a second internal position. The internal end of the lockout member 296 receives a cross-pin 308 (FIG. 15) which is fixed at one end in a collar 309 which is mounted about the shaft 208 for rotation and from which a tongue portion 310 extends.

An elongated tie rod 330 is connected between the collar 309 and the rod receiving plate 262 that extends from the displaceable pusher block 254. Upon rotation of the collar 309 and tongue 310 in response to movement of the interlock button 97, the displaceable pusher block 254 is raised from a lower position to an upper reset position. When the interlock button 97 is depressed corresponding to the lockout member 296 moving to the internal position, the control selector 90 is capable of being rotated upwardly since the narrower width portion of the lockout member 296 is now aligned with the slot 290. When the safety interlock button 97 is in the external undepressed position, the control selector 90 is prevented from being rotated to either of the upward positions, forward "a" position, or fast forward "c" position since the wider limit wing portion 302 is aligned with the slot 290 which is narrower at portion 290a than the limit wing 302.

In accordance with yet further important aspects of the present invention and when the pusher block 254 is raised to the upper position in reponse to operation of the interlock button 97, the release arm 240 is free to pivot about the pivot axis 242 in a clockwise direction either in response to tension in the film 12 upon the roller 230 and cradle 234 or upon the raising of the trip arm 266 to the reset position.

As the control lever 90 is lifted from the "still" orientation to the forward "a" position, simultaneously with the depression of the safety interlock button 97 the frame 190 engages the foot 294 of the trip arm 266. The trip arm 266 is thereby moved upwardly until the offset ledge 278 is clear of the finger 244 of the release plate 240. As the outer inclined portion 279 of the offset ledge 278 rises, the release arm 240 is pivoted temporarily in a clockwise direction (as shown in FIG. 15) until the finger 244 is cleared. Thereafter, the finger 244 of the release arm 240 returns to the trip arm retaining position to establish a reset position. When the interlock button 97 is released, the lockout member 296 returns partially to the external position which releases the pusher block 254 to move downward to the position contacting the foot 318 of the shuttle retractor link 312 for a purpose to be explained in detail hereinafter. The dimensions of the slot in the rod receiver plate 262 allow for the return movement of the rod 330, collar 309 and the lockout member 296.

Briefly, upon the spring wire 232 being rotated in response to a predetermined film tension condition, the release arm 240 is pivoted away from the trip arm 266 allowing the trip arm to move to its lower or tripped position. Hence, the projector 10 is in a reset mode for automatic stopping on the next occasion that the predetermined film tension condition occurs during forward or reverse film transport as will be explained in detail hereinafter.

In accordance with a further important aspect of the present invention, the tension sensor assembly 18 is prevented or locked out from actuating the auto-stop operation after the reset mode has been achieved except when the projector control selector 90 is in either the normal forward or reverse modes "a" and "b" respectively. This is accomplished by preventing or inhibiting any rotation of the release arm 240 in any other mode or position of the control selector 90 in response to movement of the roller 230 and pressure on the cradle 234.

More specifically, if the control selector is in the forward or reverse modes, the shuttle retractor link 312 is in the upper position wherein foot 318 biases the pusher block 254 in the upper position to free finger 248 and allow rotation of the release arm 240. However, if the control selector is in any other mode, the shuttle retractor foot 318 is in the lower position and rotation of the release arm 240 is prevented thereby inhibiting an auto-stop function even though the trip arm 266 is in the reset position. Thus, in the still, pause, fast forward and fast reverse positions, the auto-stop mode is not operational.

In an alternative embodiment and/or where a safety interlock arrangement is not provided, referring to FIG. 17, the pusher block 254 is conditioned for movement solely by the foot 318 of the shuttle retractor link 312. Thus, the lockout of the auto-stop function is obtained in the same manner as in the arrangement of FIGS. 14, 15 and 18 but the pusher block 254 is provided only with the locking finger 248 and the rod receiver plate 262 is omitted. Similarly, if no interlock device is utilized, the interlock button 97, lockout member 296, collar 309 and the connecting rod 330 are also omitted. In operation, the trip arm 266 is positioned to the reset position and the foot 318 cooperates to position the pusher block 254 as discussed hereinabove. However, the trip arm 266 and the release arm 240 as well as the pusher block 254 and the foot 318 are positioned relatively so that the foot 318 raises the pusher block 254 to the position to allow pivoting of the release arm 240 before the trip arm 266 moves into the reset position. This allows for the necessary pivoting of the finger 244 and release arm 240 before the offset ledge 278 of the trip arm 266 contacts the release arm.

In another specific alternative embodiment, the lockout member 296 and the slot 290 of the trip arm 266 are dimensioned and cooperate to provide the safety interlock function and the displaceable pusher block 254 being in the downward position restrains the control selector 90 from being positioned to the forward "a" and fast forward "c" positions. This is accomplished by the finger 248 restraining pivotal movement of the release arm 240 thereby preventing the trip arm 266 from being raised to the reset position until the block 254 is raised by actuation of the safety interlock button 97 to allow the necessary pivoting. Thus, the lockout member 296 is not provided with the limit wing portion 302 or the tabs 298. Instead, the lockout member 296 may be provided with a deformable strip positioned on an underlying strip. The lockout member includes an extending tab along the length of the deformable strip which expands after passing through the slot 290 to retain the lockout member 296 in the internal actuated position until the trip arm 266 is raised to the reset position whereupon an enlarged lower portion of the slot 290 allows the lockout member 296 to return to the external position.

In accordance with several important aspects of the present invention, the various assemblies and subassemblies described hereinabove function independently and cooperatively to provide the projector 10 with an auto-stop mode. Further and in accordance with other important aspects of the present invention, the projector can be arranged in a specific embodiment to automatically rewind the film, auto-rewind mode, in response to and further to the auto-stop condition. Briefly, when the projector 10 is being operated in the normal forward projection mode "a," the automatic stopping mechanism is set to respond to tension in the film whereby the tension sensor 18 is actuated to cause the projector to be placed in the still projection mode. Thereafter, the projector can be automatically shifted to the auto-rewind mode if the projector is equipped with such a mechanism. Although the anticipated use will be complete the rewind of the full length of film, the operator may interrupt this sequence by depression of the safety interlock button 97 whereupon the control lever 90 may be positioned to other operating modes.

To initiate the threading of film through the film path of the projector, the operator displaces the mode selector to the forward project position "a." In this operational mode, the mechanisms are arranged substantially as shown in FIG. 18. Specifically, the trip arm 266 is lifted and engages the release arm 240. Further, the tension sensor 18 is in an operational sensing mode and is displaced to an actuating high film tension condition when the end of a film is reached and no additional film is available to be withdrawn from the supply reel 86. As the film becomes taut, the release arm 240 is pivoted about the pivot point 242. As the movement of the release arm 240 occurs, the finger 244 moves clear of the offset ledge 278 on the trip arm 266. The spring 288 then biases the trip arm 266 downwardly causing several functional actuations to be initiated and/or completed.

With the downward movement of the trip lever 266, the foot 294 displaces the control lever 90 and the frame 190 from the forward project mode to the still project mode as suggested in FIG. 16. Due to the movement of the control lever 90, the control rod 94 and the frame 190, the forward take-up drive assembly 65 is deactuated through the dual clutch drive assembly 60. Simultaneously, the shuttle retractor link 312 is deactuated through actuator 206 as the control rod 94 rotates. If the projector is equipped with a safety interlock device, the lockout member 266 returns to the fully returned external position.

Thus, film transporting action of the projector mechanisms ceases or is stopped with the control selector 90 positioned in the still position. After projector operation has stopped, the operator has a selection of the operational mode to which the projector is to be actuated. Since no film is available for forward film transport, it is not advisable to select a forward projection mode and thus the projector can be set for either normal reverse projection or more likely the rewind (fast reverse) mode. That is, the control lever 90 can be shifted to either orientation "b" or "d." The control lever 90 as discussed hereinabove may also be positioned to the "c" fast forward position upon the actuation of the safety interlock button 97, but this position, of course, is not recommended. Assuming the operator cares to review the film at normal frame rate speed, the lever is shifted to the "b" position. Through the control rod 94 and clutch control assembly 102, the dual clutch drive assembly 60 and reverse drive subassembly 70 is actuated to drive the supply reel 86 to function as a film take-up reel. When the trip arm 266 caused the control lever 90 to be lowered, the control lever 90 through rotation of control rod 94 and actuator link 206 caused the shuttle 28 to be retracted and the fire shutter (not shown) to be introduced in the projection aperture 20 as though the projector had been manually conditioned for still projection. As the control lever 90 is moved to orientation "b" for reverse projection, the fire shutter is withdrawn and the shuttle 28 is permitted to engage the film for further film movement in the reverse direction. The trip arm 266 and the release arm 240 remain in the tripped condition until the projector is again conditioned for forward projection whereupon it again is placed in the reset mode and the tension sensor 18 is operable to actuate an auto-stop function when the control lever 90 is in the forward or reverse modes, positions "a" and "b" respectively.

After the projector has been automatically conditioned to the still mode, the operator most likely will elect to rewind the film through the projector to prepare for projection of another film. Thus, the control lever 90 is displaced to the rewind (fast reverse) orientation "d." Through the control rod 94 and clutch control assembly 102, the dual clutch drive assembly 60 and reverse drive subassembly 70 in the positively driven state causes driving of the film rapidly onto the supply reel 14. The trip arm 266 remains tripped, the gate and tension connecting actuator link 114 remains deactivated and the shuttle retractor link 312 is actuated to retract the shuttle 28 and position the fire shutter in the projection aperture.

Following reverse projection or rewind of the film, the projector is conditioned for forward film transport. As the control lever 90 is lifted from the "still" orientation to the "a" position (with actuation of the safety interlock mechanism if so equipped), the trip arm 266 is raised and set to the upper reset position and retained by the release arm 240. Hence, the projector is again conditioned for auto-stop on the next occasion that the predetermined film tensioncondition occurs during forward or reverse film transport.

In accordance with another important aspect of the present invention and in a specific embodiment, the projector 10 is provided with actuating mechanisms to automatically accomplish rewinding of the film referred to as an auto-rewind function, upon the occurrence of a predetermined film tension condition. To accomplish the auto-rewind function and referring now to FIGS. 14, 15 and 18, an auto-rewind actuator assembly 350 is provided including an elongated link 352 which is pivotably mounted about a stub shaft axis 354 fixed to the housing 36. One end of the actuator link 352 is connected by a pivot pin at 356 to the trip arm 266 to pivot the link 352 in a counterclockwise direction about the axis 354 corresponding to the trip action of the trip arm 266. At the opposite end of the elongated actuator link 352, a spring 358 is connected between the link 352 and a pin 360 extending from the housing 36 to bias the link 352 in a counterclockwise direction about the axis 354. An elongated wire or rod 362 connects the link 352 to a linking plate 364 which is pinned to and operates an auto-rewind clutch actuator lever 366. The linking plate 364 is positioned at the end connected to the rod 362 between two vertical ridges 365 extending from the housing 36 to form a guide channel. As the link 352 rotates in a counterclockwise direction, the plate 364 moves upward against the housing 36 in the guide channel formed by ridges 365 thereby moving the pivot pin end of the plate 364 connected to the clutch actuator lever 366 in an outward direction from the housing.

The clutch actuator lever 366 is pivotable about an axis pin 368 extending from a plate 370 carried by the clutch assembly support plate 52. The clutch actuator lever 366 is pivoted about the axis pin 368 to actuate the reverse drive subassembly 70 by displacing the clutch actuator 132 upon rotation of the auto-rewind link 352. As the clutch actuator link 366 rotates at the end connected to the plate member 364 in an outward direction about pin 368, the opposite end of the clutch actuator lever 366 provided with an extending actuator 367 rotates inwardly against the clutch actuator 132. Thus upon the trip arm 266 moving downward after a predetermined film tension condition in the forward or reverse modes in a specific embodiment, link 352 is rotated in a counterclockwise direction to actuate the reverse drive subassembly 70 in the positively driven condition to achieve fast reverse operation although the control lever selector 90 is in the still position as in the auto-stop sequence.

The auto-rewind mechanism also deactuates the gate and side tension control actuator link 114. A gate and side tension connecting rod 370 (FIG. 18) is provided and connected between the trip arm 266 and a pivot link 372 mounted near the control rod 94 about a pivot pin 374 and adjacent an extending tab 376 of the gate and side tension control link 114. The pivot link 372 is connected to the rod 370 at one end from the centrally located pivot point 374 and includes an extending pin 378 at the opposite end to engage and lift the link 114 by means of the engaging tab 376 thus deactivating the gate and side tension mechanism.

To prevent actuation of the shuttle mechanism 28 when the control selector 90 is positioned in the reverse "b" position and the projector is equipped with an auto-rewind mechanism, the auto-rewind link 352 is provided with a downwardly extending foot 380 to engage a tab 382 extending from the shuttle retractor link 312. When the shuttle retractor actuator 206 rotates and the shuttle retractor link 312 attempts to move upward, foot 380 contacts tab 382 thereby preventing the shuttle mechanism 28 from being actuated.

The auto-rewind mechanism in a specific embodiment also includes a connecting rod 384 (FIGS. 18 and 22) between the link 352 and the brake assembly 195 to deactuate the brake shoes 199, 201 upon the rotation of the link 352. In a specific embodiment, the brake assembly 195 is not provided with the auto-rewind function and in that case the connecting rod 370 would not be provided.

In accordance with various other important aspects of the present invention and referring now to FIGS. 26 through 29, in specific alternative embodiments the auto-stop, reset, auto-rewind, and drive assembly braking functions may be accomplished utilizing different arrangements than those described hereinabove. The alternative embodiments of FIGS. 26 through 29 will be described in connection with the projector apparatus of FIGS. 1 through 25 and all parts and assemblies not shown in detail in FIGS. 26 through 29 are substantially identical with those described hereinabove with identical reference numerals referring to similar identified parts in FIGS. 1 through 25.

Figure 26:
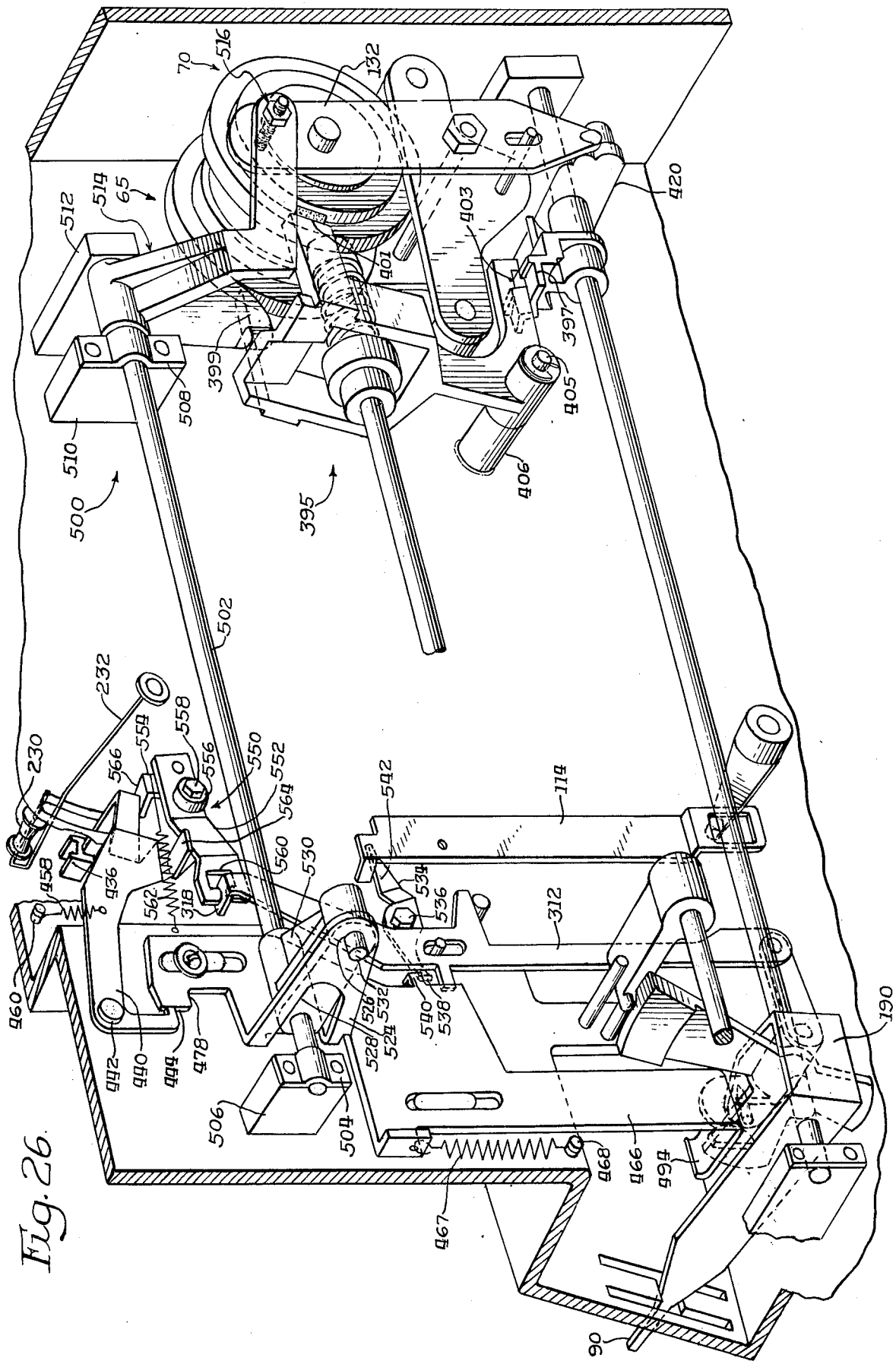
FIG. 26 is a perspective view of a motion picture projector incorporating further important aspects of the present invention with parts removed and broken away for clarity and illustrating alternate arrangements of certain assemblies of FIGS. 14 through 25.

Considering now the brake assembly arrangement 395, FIG. 26, which provides a similar function as that of the brake assembly 195, the brake assembly 395 is pivoted for rotation about a pin 405 extending from a housing portion 406 and is generally formed in the shape of an "L" wherein the two brake shoes 399, 401 are located at the top of the "L," the pivot point 405 is located at the intersection of the legs of the "L" and a cam follower portion 403 is located along the bottom or horizontal leg of the "L." The brake assembly 395 is biased toward the clutch plates 160 by a spring 407 (FIG. 27) connected to a clutch assembly support plate extending from the housing 36.

In accordance with an important aspect of the present invention, a brake cam 397 for controlling the brake assembly 395 extends from a double track cam member 420 similar to the cam member 120 (FIG. 23) so as to rotate with the control rod 94 and engages the cam follower portion 403 (FIGS. 26 and 27) of the brake assembly 395. In a preferred specific embodiment the brake cam 397 is fabricated or molded as an integral part of the double track cam member 420. The cam track 397 is oriented transversely to the horizontal cam follower leg 403 and operates in a circular path or rotates about the rod 94. The brake engaged position of the brake assembly 395 corresponds to the center position 397a of the cam 397. As the control rod 94 is rotated to either side, corresponding to movement of the control selector 90 to the normal forward or reverse position from the still center position or to the fast forward or fast reverse positions from the center pause position, the raised portions 397b, c at either end of the cam track 397 rotate the brake assembly 395 in a counterclockwise direction about the pivot pin 405 thereby disengaging the brake shoes 399, 401 from the clutch plates 160.

In accordance with another important aspect of the present invention and referring now to FIG. 29, a control lever selector detent mechanism 410 is provided by a cam track 412, which is formed as an integral part of the cam member 420 in a specific embodiment, and a detent cam follower 414 extending from a housing portion 416. The detent cam follower 414 is formed by a cam follower button 418 which is biased in an outward manner by a spring 422. The cam follower button 418 and the spring 422 are positioned within a receiver cavity 424 formed centrally within the housing portion 416. The cam track 412 is arranged on the cam member 420 so as to position a sloped cam track surface 412a in operative contact with the detent cam follower 414 when the control selector 90 is positioned in the fast forward "c" orientation. The surface 412a includes a convex ramp surface extending outwardly from the center cam track portion aligned with the detent cam follower button 418 when the control selector 90 is in the pause position. The detent cam follower 414 is effective to bias the control selector 90 downwardly, to rotate the control rod 94 out of the fast forward "c" position. Thus, the control selector 90 will not remain in the fast forward position unless a force is applied to the control selector by the operator of the projector to overcome the force of the cam follower 414 against the cam surface 412a.

In the "a," "b," and "d" orientations corresponding to the forward, reverse and rewind modes, the cam track 412 is provided with triangular cross-sectional surfaces. A detent function is provided by the cam follower arrangement 414 as the cam surface 412 is rotated to these positions. The cam follower button 418 is biased inwardly as it rides against the inclined triangular surfaces and over the vertices. As the cam track 412 is rotated to position the reverse slope of the triangular cross-sectional surfaces opposite the cam follower button 418, the cam follower button 418 is biased outwardly to provide the detent function. The overall cam surface 412, except for the narrow width portion 412a, forms a center trough having inclined sides. Reverse downwardly slope surfaces are formed on either side of the ridges formed by the inclined sides of the trough (an overall saw-tooth or serrated cross section). The center trough extends along the entire width of the cam track surface 412 as do the ridges except for the fast forward portion 412a.

The trip arm 466 (FIG. 26) is similar in function and structure to trip arm 266 and includes a spring 467 which biases the trip arm 466 downwardly to the lower tripped position and is connected between the trip arm 466 and a pin 468 extending from the housing 36. The trip arm 466 includes an offset ledge 478 similar to ledge 278 of the trip arm 266 (FIG. 18) that engages and is retained by a finger 444 of a release arm 440 which is similar to the release arm 240. The release arm 440 is pivoted about a pivot pin 442 fixed to a housing portion and includes a cradle 434 formed on an extending arm 436. The release arm 440 is biased in a counterclockwise direction by a spring 458 extending from the release arm to a pin 460 extending from the housing 36. The operation of the roller 230 and spring wire 232 with the cradle 436 and release arm 440 as well as the operation of the trip arm 466 with the release arm 440 are substantially identical with that described hereinabove and will not be discussed in detail.

In accordance with an important aspect of the present invention, a release locking assembly 550 (FIG. 26) is pivotally mounted adjacent the cradle arm 436 of the release arm 440 and the foot 318 of the retractor link 312. The release locking assembly 550 is effective to inhibit the operation of the release arm 440 when the release arm is contacted by the tension mechanism roller 230 and when the retractor link 312 is in the lower position. The retractor link 312 being in the lower position corresponds to the control lever 90 being in any position of the "H" slot pattern except the normal forward or reverse modes "a" and "b" respectively. When the control selector 90 is in any position except the normal forward or reverse modes the release arm 440 is inhibited from being pivoted to release the trip lever 466. Thus, the auto-stop or auto-rewind modes are not operational. In the forward and reverse projection modes, the release locking assembly 550 is positioned by the retractor link 312 to be free of the cradle arm 436 of the release arm 440 so that the normal operation of the release arm finger 444 to release the trip arm 466 is effected when the film tension sensor 18 is displaced due to the predetermined tension condition in the film.

Considering the release locking assembly 550, a first positioning arm 552 and a second locking arm 554 are pivotally mounted at pin location 556 by a screw 558. It should be understood, however, that the arms 552 and 554 can also be fabricated as a one arm assembly. The positioning arm 552 includes an engaging bifurcated portion 560 which interfits with the foot 318 of the retractor link 312 to convert the vertical movement of the retractor link 312 to pivoting of the positioning arm 552 about the pivot point at 556. The locking arm 554 is pivotally spring biased by a spring 562 in a counterclockwise direction and the degree of rotation is limited by a stop tab 564 of the locking arm 554 located on the left side of the pivot point 556 which contacts the positioning arm 552 so that the locking arm 554 pivots to follow the positioning arm 552. The spring 562 is either a tension coil spring connected between the housing and the arm 554 or a torsion spring coiled about the pivot point 556. A locking tab 556 extends from the right side of the locking arm 554 in the vicinity of the cradle arm 436. In the lower retracted position of the retractor link 312 corresponding to the still, pause, fast forward and rewind modes of operation, the locking tab 566 is in engagement under the cradle arm 436 of the release arm 440 and inhibits pivotal movement of the release arm 440. As the tension roller 230 moves downward in response to increasing tension in the film (in the still, pause, fast forward and rewind positions) the roller 230 cannot pivot the release arm 440 since the release arm is attempting to pivot clockwise against the locking tab 566 which is restrained from movement in the counterclockwise direction, the direction the release arm 440 is attempting to displace the arms 552 and 554. In a specific embodiment, the trip arm 466 and the release arm 440 are positioned so that the offset ledge 478 contacts the release finger 444 even when the trip arm 466 is in the lower tripped position. Thus, when the trip arm 466 is raised to the reset position by the control selector 90, the release arm does not need to be pivoted clockwise to allow movement of the trip arm 466 although the release arm 440 is not restrained against clockwise pivoting.

In accordance with several important aspects of the present invention, the several assemblies and subassemblies described hereinbefore function independently and cooperatively to provide the projector 10 with an auto-stop mode. Further, the projector can be conditioned to rewind the film automatically (auto-rewind mode) responsive to the automatic stopping condition. Briefly, as discussed hereinabove when the projector is being operated in the normal forward projection mode "a," the automatic stopping mechanism is set to respond to tension in the film whereby the tension sensor 18 is actuated to cause the projector to be placed in the still projection mode. Thereafter, the projector can be automatically shifted to the auto-rewind mode if the projector is equipped with such a mechanism. Although the anticipated use will be to complete the rewind of the full length of film the operator may interrupt this sequence by depression of the safety interlock button whereupon the control lever 90 may be positioned to other operating modes.

To initiate the threading of film through the film path of the projector, the operator displaces the control selector 90 to the forward projection position "a." Specifically the trip arm 466 is lifted and engaged by the release arm 440 in the upper reset position. Further, the tension sensor 18 is in an operational sensing mode and is displaced to an actuating high film tension condition when the end of a film is reached and no additional film is available to be withdrawn from the supply reel 86. As the film becomes taut, the release arm 440 is pivoted about the pivot pin 442 and the finger 444 moves clear of the offset ledge 478 on the trip arm 466. The spring 488 then biases the trip arm 466 downwardly causing several functional actuations to be initiated and/or completed.

With the downward movement of the trip lever 466, the foot 494 displaces the control lever 90 and the frame 190 from the forward projection mode to the still projection mode. Due to the movement of the control lever 90, the control rod 94 and the frame 190, the take-up drive assembly 65 is deactuated through the clutch assembly 60. Simultaneously, the shuttle retractor link 312 is deactuated through actuator 206 as the control rod 94 rotates. Thus, film transporting action of the projector mechanisms is stopped with the control selector 90 in the still position. The control lever 90 can now be shifted to either orientation "b" or "d" corresponding to the reverse or rewind modes. The control lever 90 as discussed hereinabove may also be positioned to the "c" fast forward position upon the actuation of the safety interlock button 97, but this position, of course, is not recommended.

Assuming that the operator cares to review the film at normal frame rate speed, the lever is shifted to the reverse "b" position. Through the control rod 94 and clutch control assembly 102, the clutch assembly 60 is actuated to drive the supply reel 86 to function as a film take-up reel. When the trip arm 466 caused the control lever 90 to be lowered, the control lever 90 through rotation of control rod 94 and actuator link 206 caused the shuttle 28 to be retracted and the fire shutter (not shown) to be introduced in the aperture at the projection station 20 as though the projector had been manually conditioned for still projection. The trip arm 466 and the release arm 440 remain in the tripped condition until the projector is again conditioned for forward projection whereupon it again is in the reset mode and the tension sensor 18 is operable to actuate an auto-stop function when the control selector 90 is in the forward or reverse modes, positions "a" and "b" respectively.

After the auto-stop function has been actuated, the operator will most likely elect to rewind the film through the projector to prepare for projection of another film. From the still mode orientation, the control lever 90 is displaced to the rewind (fast reverse) orientation "d." Through the control rod 94, and clutch control assembly 102, the dual clutch drive assembly 60 functions to drive the film rapidly onto the supply reel 86. The trip arm 466 remains tripped, the gate and tension control actuator 114 remains deactivated and the shuttle retractor link 312 is actuated to retract the shuttle 28 and position the fire shutter in the projection aperture.

Following reverse projection or rewind of the film the projector may again be in condition for forward film transport. As the control selector is lifted from the "still" orientation to the "a" position, the trip arm 466 is raised to the upper reset position and retained by the release arm 440. Hence, the projector is again conditioned for auto-stop operation on the next occasion that the predetermined film tension condition occurs during forward or reverse film transport.

In accordance with another important aspect of the present invention and in a preferred specific embodiment, the projector 10 is provided with actuating mechanisms to automatically accomplish rewinding of the film referred to as an auto-rewind function upon the occurrence of a predetermined film tension condition. To accomplish the auto-rewind function, an auto-rewind control actuator assembly 500 is provided including an auto-rewind shaft 502 disposed across the length of the projector 10 and mounted for pivotal movement and restrained against axial movement by a bearing 504 carried by an extending housing portion 506 at one end near the trip arm 466, by a similar bearing 508 carried by an extending housing portion 510 near the brake assembly 395 and by a housing portion 512 to the right of the bearing 508 that extends outwardly to provide a stop for the shaft 502. An auto-rewind actuator arm 514 is carried by the shaft 502 for rotation therewith and restrained against relative movement thereto. The auto-rewind clutch actuator arm 514 extends outwardly and downwardly in the vicinity of the clutch actuator arm 132 and is provided with a screw or threaded rod and nut arrangement 516 to contact the actuator arm 132.

Upon rotation of the shaft 502 in a clockwise or right-hand direction, FIG. 26, the auto-rewind actuator arm 514 rotates to displace the clutch actuator 132 inwardly to actuate the reverse drive subassembly 70 in a positively driven condition to achieve fast reverse operation independently of the position of the control selector 90. In the dual clutch drive assembly 60 as shown in FIG. 26, the clutch actuators 130 and 132 extend beyond the center of the drive assembly and actuate the drive disc 170 at a higher position than the actuators shown in FIG. 22. A switch (not shown) mounted adjacent the auto-rewind actuator arm 514 is actuated to control the operation of an auto-rewind indicating lamp provided within the interlock button 97. However, the overall operation is similar.

Also extending from the auto-rewind control actuator arm 514 and molded integrally therewith in a specific embodiment is an auto-rewind brake assembly actuator arm 520. The auto-rewind brake assembly actuator 520 extends downwardly in the vicinity of the brake shoes 399, 401 and includes a cam member 522 which is dimensioned to displace the brake assembly 395 to the "off" position when the shaft 502 is rotated.

To accomplish the rotation of the shaft 502 and the auto-rewind function as the trip arm 466 returns to the lower position, a flange 524 is provided on the trip arm 466 extending outwardly from the trip arm 466 and including a pin receiving hole 526. The flange 524 also has a central aperture 528 through which the shaft 502 extends. A translation collar 530 is carried by the shaft 502 that extends into the vicinity of the receiving hole 526 and the pin 532 extends from the hole 526 into the translation collar 530 carried on the shaft 502. The translation collar 530 is carried by the shaft 502 so as to rotate therewith. As the trip arm 466 moves downward after a predetermined film tension condition has occurred and the release arm 440 has been pivoted releasing the trip arm 466, the pin 532 rotates the translation collar 430 and thus the shaft 502 to initiate the auto-rewind sequence.

When the trip arm 466 moves downward and the foot 494 rotates the selector lever 90 into the still position, the shuttle retractor link 312 also moves downward to deactuate the shuttle mechanism 28 as described hereinabove. In accordance with a further important aspect of the present invention, the gate and side tension actuator link 114 is also moved upwardly to deactuate the associated mechanism to remove the gate and side tension at gate 26 in response to an auto-rewind link 534 which is pivoted at shaft 536. The auto-rewind link 534 has a left tab portion 538 which is engaged by an extending tab 540 of the trip arm 466 so as to rotate the right side of the link 534 upwardly against an extending and engaging tab 542 of the gate and side tension actuator link 114.

Thus upon the trip arm 466 moving downward after a predetermined film tension condition in selected operational modes and after pivoting of the release arm 440, the auto-rewind sequence occurs in addition to the control selector 90 being positioned in the still mode. In the auto-rewind sequence, the gate and side tension actuator link 114 and the shuttle retractor link 312 are positioned to the deactuated positions. The shaft 502 is rotated and the auto-rewind mechanism 500 is effective through actuator arms 520 and 522 to condition a positive drive mode of the reverse drive subassembly 70 and remove the brake assembly 395. The fast reverse automatic rewind mode continues until the operator moves the control selector 90 to the forward "a" position which resets the trip arm 466 whereupon the selector 90 is lowered to the still position and all film transport operation ceases.

In accordance with further important aspects of the present invention, the operative mechanical components of the projector 10 are mounted on the single, unitarily molded chassis or housing 36. The housing 36 in a specific embodiment is foam molded and cured after the molding operation to form a smooth hard outer shell or non-porous surface while achieving a housing that is lightweight and inexpensive to produce in a manufacturing process.

Figure 1:
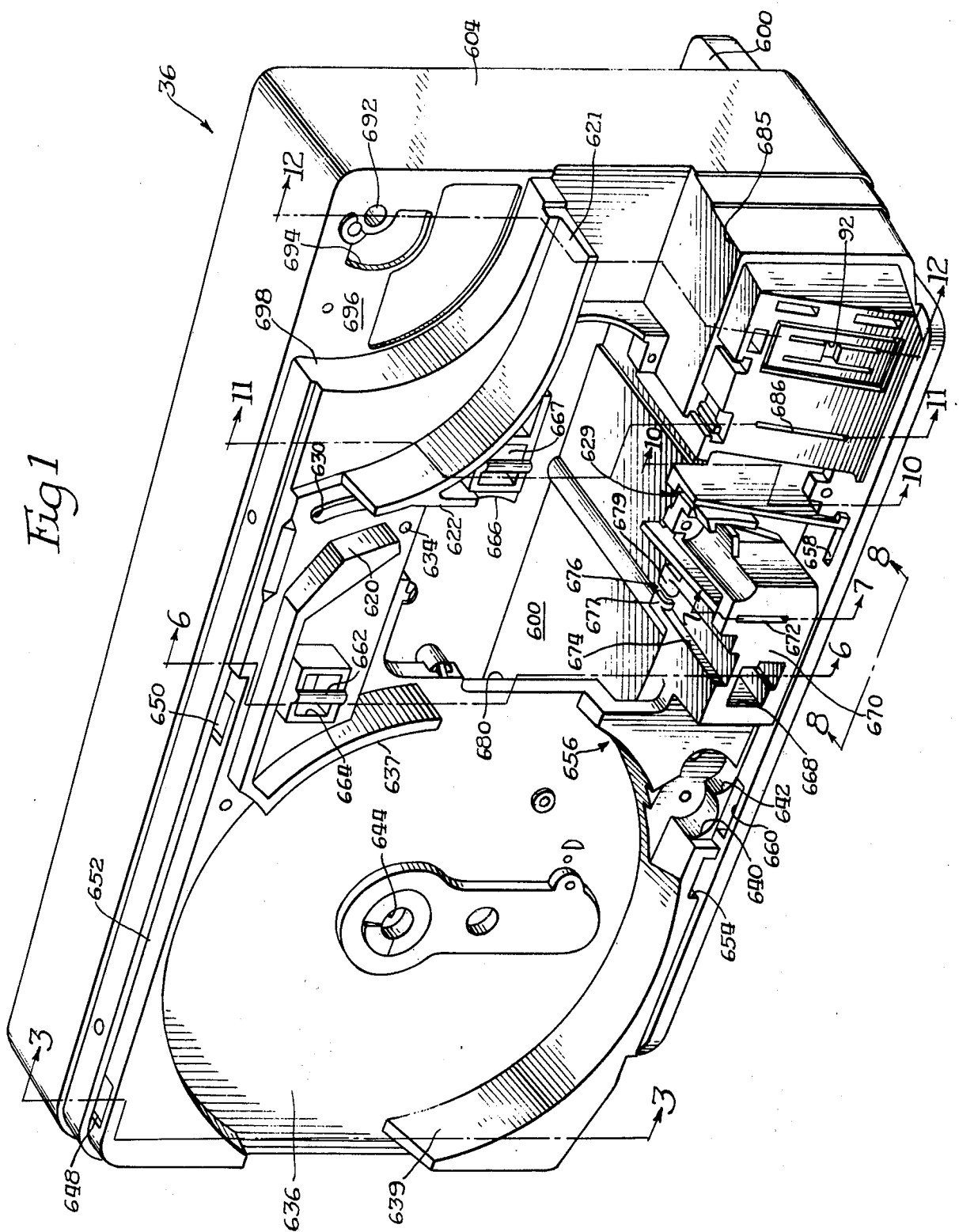
FIG. 1 is a front perspective view of a molded housing of a motion picture projector constructed in accordance with the principles of the present invention.
Figure 2:
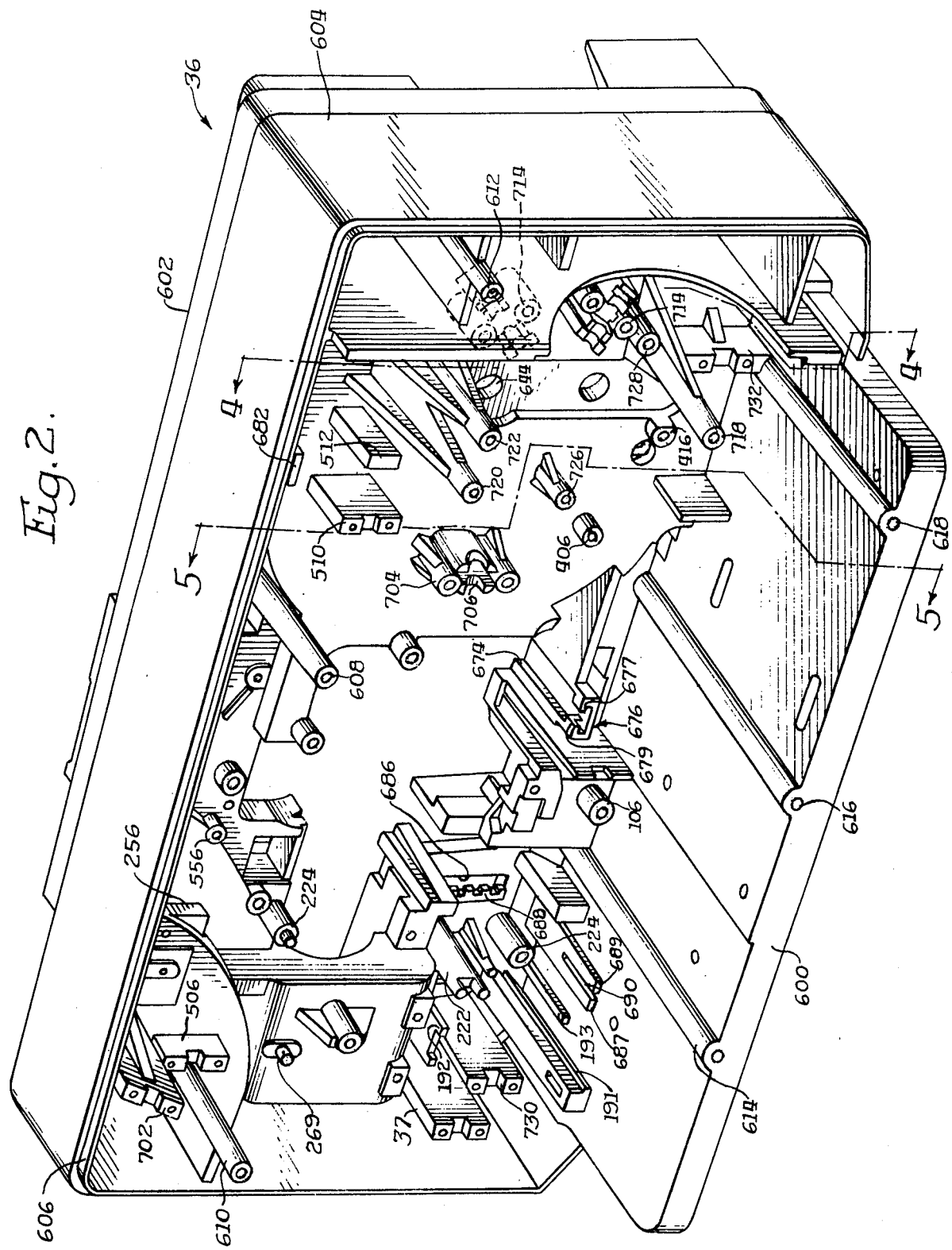
FIG. 2 is a rear perspective view of the molded housing of the motion picture projector of FIG. 1.

The housing 36, referring to FIGS. 1 and 2, includes a generally rectangular base 600 and a unitarily molded concave upstanding edgewall 602 further defined and circumscribed by a strengthening flange 604. The strengthening flange portion 604 is also provided with a lip 606 about the perimeter to interfit with a rear housing cover (not shown) secured by screws into the threaded sleeve portions 608, 610, 612, 614, 616 and 618 which are molded integrally with the housing 36 and include respective strengthening ribs and flanges. The threaded sleeves 614, 616 and 618 are molded as raised portions of the base 600.

Referring now to FIGS. 1 through 13 and concerning other important aspects of the present invention, various portions and cooperating components of the assemblies and mechanisms described hereinbefore are integrally molded with the housing.

Specifically, concerning the film path of the projector as defined by various integrally molded portions of the housing, a sloped extending guiding surface 620 is provided adjacent and below the tension sensing assembly 18. Further, a curved guiding rib 622 is molded opposite the surface 620 and forms a part of a downwardly curving extending surface 621 that provides clearance for large supply reels. An elongated horizontal recess 624 is formed in the molding process between the shuttle mechanism 28 and the take-up assembly 16 near the base 600. Intermediate the recess 624 and the shuttle 28, a curved extending rib 626 and an opposed recessed sidewall surface 628 are provided in a substantially vertical arrangement to define a passageway or recess 629. The film is threaded over the tension sensor mechanism 18 between the opposed surfaces 620 and 622, downward past the shuttle 28 and through the gate 26, between the surfaces 626 and 628, horizontally along the recess 624 and into the area of the take-up assembly 16.

A curved elongated slot 630 is provided to allow passage through the housing 36 and movement of the roller 230 and the cradle 234. A guide roller 632 is positioned below the guide surface 620 and rotatably mounted through a hole 634 in the housing. Similarly, cooperating guide rollers 636 and 638 are arranged and rotatably mounted through holes 633 and 635 in the housing wall 602 at the end of the recess 624 near the take-up assembly 16 in semicircular receiving recesses 640 and 642 respectively. The take-up spindle 64 passes through a hole 644 in the housing. A circular receiving recess portion 646 is defined about the central hole 644 by two semicircular ribs 637 and 639 to accept the take-up reel 16 which is a self-threading or automatic threading reel in a specific embodiment. A generally rectangular take-up cover (not shown) overlays the circular recessed portion 646 and the take-up reel 16 and is retained by the housing 36 by means of the interlocking of a pair of tabs on the cover into a pair of slotted portions 648 and 650 formed through a housing ledge 652. A spring clip of the take-up cover interfits with a receiving slot 654 near the base 600 of the housing 36. The take-up reel cover generally forms a seal around the take-up reel. A take-up threading air assist vent 656 is provided through the housing 36 in the lower right portion of the recess 646 to supply a directed stream of air from the circulation fan toward the take-up spindle 64 to assist in the automatic threading of the film 12 onto the take-up reel 16.

A control and mechanism cover overlays the right half of the housing 36 adjacent the projection lamp 22, the shuttle mechanism 28 and the projection lens 24 and includes a pair of extending tabs interfitting with receiving slots 658 and 660 formed along the base 600. A pair of deformable spaced apart prongs are provided on the control mechanism cover that engage a central rod portion 662 of an extending square frame 664 which opens to the rear side of the housing 36. Ventilating air is also provided through the passage of the square frame 664 to the adjacent projection lamp 22. A similar arrangement is provided by an extending frame 666 having a central rod portion 667 above the projection lens 24. The control and mechanism cover also overlays the projection lamp 22 so as to prevent light from radiating into the environment surrounding the projector 10 and directs light by means of a reflective inside panel toward the projection lens 24.

Various openings are formed in the control and assembly cover to allow access to the operating controls such as the framer control, the film speed control lever, the main control switch, the lens adjustment control lever, the film counter and the film size selection lever (not shown in detail). The control and assembly cover is further provided with extending surfaces to cooperate with the molded film path defining structures of the housing 36 discussed hereinabove. A film counter mechanism receiving passage 668 is provided through a hollow extending platform 670 of the housing 36 along with an elongated slot 672 for the passage of a film size selector lever. An elongated channel 674 is formed along the top surface of the extending platform 670 with a narrower "T"-shaped retaining arrangement 676 formed in the channel 674 at the interior end by a pair of upstanding inwardly curved fingers 677, 679. A projection lamp ejector lever 678 is retained in the channel 674 and the arrangement 676 by the engagement of tabs on the lever 678 being retained by the fingers 677, 679. The ejector lever 678 is effective to assist in the removal of the projection lamp 22 upon pivoting of the lever 678 about the retaining slot 676.

A large central opening 680 is provided through the housing 36 adjacent the projection lamp 22, the shuttle 28 and associated mechanism, the shutter 30 and the projection lens 24 to provide space for the mounting of these mechanism assemblies.

Cooperating with the rear housing cover, a pair of carrying handle receiving slots 682 and 684 (FIGS. 4 and 6) are provided to receive projecting pins extending from the carrying handle (not shown). When assembled, the handle is rotatably retained between the rear housing cover and the housing 36 as the handle projecting pins rotate within the slots 682 and 684. The carrying handle is movable into a flat recessed storage position into a receiving portion formed in the rear cover.

An extending hollow control platform 685 is molded in the edge wall 602 below the projection lens 24. A slot 686 is provided adjacent the "H" shaped control selector slot 92 in the vertical surface of the control platform 685 for the passage of a film speed control (frame rate) lever. The edge wall 602 of the housing 36 in the area of the slot 686 (FIGS. 2 and 11) includes a series of detent tabs 688 which cooperate with the film speed control lever to define film speed detent positions. The film speed control lever extends from a pivotal adjustment arm which rotates at one end between a pair of spaced tabs 687, 689 extending from the base 600 and forming a receiving channel 690.

The driven shaft 80 of the supply assembly 14 passes through a hole 692 in the edgewall 602 of the housing 36. A recessed quadrant-shaped surface 694 is formed in the edgewall 602 adjacent the hole 692 and cooperates with an extending tab of the arm assembly 88 to provide stop positions for the arm along with a detent mechanism internal to the arm 78. A larger recessed quadrant surface 696 of the edgewall 602 is formed by a downwardly sloped extending "ski-slope" surface 698 to allow the rotation of the quadrant-shaped arm assembly 78 from a first upwardly rotated position for large supply reels as shown in FIG. 13 to a downward position for small supply reels and for storage. The arm assembly 78 substantially matches or meets flush with the front extending edge of the sloped surface 698. The volumetric shape of the arm assembly is identical to that defined by the recessed quadrant portion 696.

The drive shaft 72 driving the shaft 80 through the gear pair 82 is rotatably supported in a bearing member 700 which is mounted by means of screws into threaded portions of an extending post 702 of the housing that includes several strengthening ribs.

The bearing member 50 and the mechanism support plate 52 are mounted to an extending housing post 704 by means of screws into threaded positions of the post 704 which is slotted at 706 to allow clearance for the mounting position of the bearing member 50.

In a specific embodiment, several idler rollers or snubbers 708 (FIG. 27) are arranged circumferentially around the dual clutch drive assembly 60 to contact the drive discs 150 and support the clutch assembly. The snubbers 708 each are rotatably mounted by means of attached shafts 710 in bearings 712. The bearings 712 are attached to extending posts 714 of the housing 36.

The dual clutch drive assembly 60 is supported through the shaft 62 by a support plate 716 which is mounted to extending posts 718, 720 and 722 by screws into threaded sleeves in the posts 718, 720 and 722. The posts 718, 720 and 722 are molded with the housing 36 and include several strengthening ribs. The support plate 716 also carries the drive shaft 72. The clutch actuator support platform 135 (FIGS. 14, 17, 18 and 27) is attached to two extending molded posts 726 and 728 by means of screws secured into threaded sleeve portions of the posts 726 and 728.

The bearing members 96 at either end of the projector for carrying the control rod 94 are attached to extending posts or planar elements 730 and 732 by means of screws secured into threaded sleeve portions of the posts 730 and 732.

Although the housing 36 and the above-described housing portions, structures and defining surfaces are integrally molded in a preferred specific embodiment, it should be understood that the various housing portions, structures and defining surfaces may also be attached and formed by cementing, heat-stacking and other conventional methods.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a motion picture projector having a forward and reverse film transporting drive assembly selectively actuable in at least a forward and a reverse mode, an assembly for sensing a predetermined film tension condition and a controller assembly for selecting various operating modes, a control mechanism for selectively actuating a reverse mode of operation upon the occurrence of the predetermined film tension condition comprising:

means responsive to said tension sensing assembly in a first predetermined projector operating mode for conditioning said controller assembly to a second predetermined operating mode when said predetermined film tension condition is sensed; and means for actuating said film transporting drive assembly in a reverse mode, said controller assembly conditioning means comprising means movable between a first sensing position and a second operated position for operating said controller assembly and means responsive to said tension sensing assembly for controlling the position of said operating means, said reverse mode actuating means being coupled to said operating means of said controller assembly conditioning means and responsive to actuate said film transporting drive assembly in the reverse mode upon said operating means moving from said first sensing position to said second operating position, said film transporting drive assembly comprises a pivotable reverse drive actuating member which is displaced to actuate said drive assembly in a reverse mode, the movement of said operating means from said first to said second position is a linear displacement, and said reverse mode actuating means comprises means for translating said linear displacement movement of said operating means to a rotational movement, means for coupling said rotational movement of said translating means and means coupled to said coupling means for displacing said pivotable reverse drive actuating member upon rotation of said translating means.

2. The reverse mode actuating control mechanism of claim 1 wherein said second predetermined operating mode is a mode wherein the film transporting drive assembly is not actuated by said controller assembly, said pivotable reverse drive actuating member being displaced at a first end on one side of the pivotal point when actuated by said projector controller assembly and at a second end on the opposite side of said pivotal point by said displacing means.

3. The reverse mode actuating control mechanism of claim 1 wherein said translating means comprises a pivotal actuating member fixedly carried at one end by said coupling means and pivotably carried at the other end by said operating means of said controller assembly conditioning means.

4. The reverse mode actuating control mechanism of claim 3 wherein said coupling means comprises a control rod and said displacing means is fixedly carried by said control rod.

5. The reverse mode actuating control mechanism of claim 4 wherein said film transporting drive assembly comprises a brake assembly which is pivotally actuable and said displacing means further comprises a brake assembly displacing member.

6. The reverse mode actuating control mechanism of claim 5 wherein said brake assembly displacing member is formed as an extending member of said displacing means.

7. The reverse mode actuating control mechanism of claim 6 wherein said brake assembly displacing member includes a cam surface and said brake assembly includes a cam follower for cooperative engagement with said cam surface.

8. The reverse mode actuating control mechanism of claim 1 wherein said projector further comprises a gate and side tension actuating link which is movable between first and second vertical positions for actuating an associated gate and side tension mechanism, said reverse mode actuating means further comprising gate and side tension means for deactuating said gate and side tension actuating link.

9. The reverse mode actuating control mechanism of claim 8 wherein said gate and side tension link deactuating means comprises a pivotal deactuating member positioned between said gate and side tension link and said operating means of said controller assembly conditioning means, said operating means comprises a first engaging tab for pivoting said pivotal member upon movement of said operating member to said second operating position, and said gate and side tension link comprises a second engaging tab which is engaged upon pivoting of said pivotal deactuating member.

10. A control mechanism for selectively actuating a motion picture projector to a rewind mode of operation upon to occurrence of a predetermined film tension condition, the motion picture projector having a forward and reverse-rewind film transporting drive assembly selectively actuable in at least a forward and a reverse-rewind mode; an assembly for detecting the predetermined film tension condition; a controller assembly manually shiftable in a plurality of positions for selecting various operating modes of the motion picture projector; and a position shifting assembly responsive to the tension detecting assembly and effective to shift the controller assembly from a forward mode to a non-film transporting mode upon the occurrence of the predetermined film tension condition, the position shifting assembly linearly moveable between a first detecting position and a second operated position, the rewind mode actuating control mechanism comprising:

means connected to said position shifting assembly for translating the linear movement of said position shifting assembly from said first detecting position to said second operated position to a rotational movement;

means for coupling said rotational movement of said translating means; and means connected to said coupling means for actuating said film transporting drive assembly in the reverse-rewind mode of operation, said film transporting drive assembly comprising a pivotable reverse drive actuating member which is displaced to actuate said film transporting drive assembly in the reverse rewind mode, said actuating means comprising an actuating arm for displacing said reverse drive actuating member upon rotation of said translating means.

11. The reverse mode actuating control mechanism of claim 10 wherein said translating means comprises a pivotal actuating member fixedly carried at one end by said coupling means and pivotably carried at the other end by said position shifting assembly.

12. The reverse mode actuating control mechanism of claim 11 wherein said coupling means comprises a control rod mounted for rotation by said pivotal actuating member.

13. The reverse mode actuating control mechanism of claim 12 wherein said actuating arm is fixedly carried by said control rod.

14. In a motion picture projector having a forward and reverse film transporting drive assembly selectively actuable in at least a forward and a reverse mode, an assembly for sensing a predetermined film tension condition and a controller assembly for selecting various operating modes, a control mechanism for selectively actuating a reverse mode of operation upon the occurrence of the predetermined film tension condition comprising:

means responsive to said tension sensing assembly in a first predetermined projector operating mode for conditioning said controller assembly to a second predetermined operating mode when said predetermined film tension condition is sensed; and means for actuating said film transporting drive assembly in a reverse mode, said controller assembly conditioning means comprising means movable between a first sensing position and a second operated position for operating said controller assembly and means responsive to said tension sensing assembly for controlling the position of said operating means, said reverse mode actuating means being coupled to said operating means of said controller assembly conditioning means and responsive to actuate said film transporting drive assembly in the reverse mode upon said operating means moving from said first sensing position to said second operating position, said film transporting drive assembly comprises a pivotable reverse drive actuating member which is displaced to actuate said drive assembly in a reverse mode, the movement of said operating means from said first to said second position is a linear displacement, and said reverse mode actuating means comprises means for translating said linear displacement movement of said operating means to a rotational movement, means for coupling said rotational movement of said translating means and means coupled to said coupling means for displacing said pivotable reverse drive actuating member upon rotation of said translating means, said translating means comprises an elongated pivotably mounted member pivotally connected at one end to said operating means of said controller assembly conditioning means; said coupling means comprises a connecting rod carried at said second end of said elongated pivotably mounted translating member and a pivot plate connecting said connecting rod to said displacing means; and said displacing means comprises a pivotably mounted displacing member.

* * * * *

UNITED STATES PATENT OFFICE
CERTIFICATE OF CORRECTION

PATENT NO. : 4,116,551
DATED : September 26, 1978
INVENTOR(S) : Raymond W. H. Kim et al It is certified that error appears in the above-identified patent and that said Letters Patent are hereby corrected as shown below:

Column 27, line 6 (Claim 10, line 3), change "to" to --the--.

Signed and Sealed this

Seventeenth Day of July 1979

[SEAL]

Attest:

LUTRELLE F. PARKER

Attesting Officer   Acting Commissioner of Patents and Trademarks